(12) United States Patent
Aubuchon

(10) Patent No.: US 6,906,848 B2
(45) Date of Patent: Jun. 14, 2005

(54) MICROMIRROR SYSTEMS WITH CONCEALED MULTI-PIECE HINGE STRUCTURES

(75) Inventor: Christopher M. Aubuchon, Palo Alto, CA (US)

(73) Assignee: Exajoule, LLC, Palo Alto, CA (US)

( * ) Notice: Subject to any disclaimer, the term of this patent is extended or adjusted under 35 U.S.C. 154(b) by 0 days.

(21) Appl. No.: 10/374,574

(22) Filed: Feb. 24, 2003

(65) Prior Publication Data

US 2004/0165249 A1 Aug. 26, 2004

(51) Int. Cl.⁷ .............................................. G02B 26/00
(52) U.S. Cl. ....................... 359/291; 359/298; 359/223; 359/224
(58) Field of Search .................. 359/290–292, 359/298, 223, 224

(56) References Cited

U.S. PATENT DOCUMENTS

| | | | |
|---|---|---|---|
| 5,083,857 A | 1/1992 | Hornbeck | |
| 5,096,279 A | 3/1992 | Horneck | |
| 5,203,208 A | 4/1993 | Bemstein | |
| 5,212,582 A | 5/1993 | Nelson | |
| 5,535,047 A | 7/1996 | Hornbeck | |
| 5,583,688 A | 12/1996 | Hornbeck | |
| 5,600,383 A | 2/1997 | Hornbeck | |
| 5,777,719 A | 7/1998 | Williams et al. | |
| 5,835,256 A | 11/1998 | Huibers | |
| 5,991,066 A | 11/1999 | Robinson et al. | |
| 6,028,689 A | 2/2000 | Michalicek et al. | |
| 6,028,690 A | 2/2000 | Carter et al. | |
| 6,198,190 B1 | 3/2001 | Garcia | |
| 6,220,561 B1 * | 4/2001 | Garcia | 248/487 |
| 6,232,936 B1 | 5/2001 | Gove et al. | |
| 6,255,454 B1 | 7/2001 | Grevwall | |
| 6,323,982 B1 | 11/2001 | Hornbeck | |
| 6,329,738 B1 | 12/2001 | Hung et al. | |
| 6,337,760 B1 | 1/2002 | Huibers et al. | |
| 6,338,559 B1 | 1/2002 | Williams et al. | |
| 6,348,907 B1 | 2/2002 | Wood | |
| 6,351,330 B2 | 2/2002 | Ko | |
| 6,356,378 B1 | 3/2002 | Huibers | |
| 6,360,036 B1 | 3/2002 | Couillard | |
| 6,369,931 B1 | 4/2002 | Funk et al. | |
| 6,385,364 B1 | 5/2002 | Abushagur | |
| 6,388,661 B1 | 5/2002 | Richards | |
| 6,389,190 B2 | 5/2002 | Solgaard et al. | |
| 6,392,221 B1 | 5/2002 | Aksyuk et al. | |
| 6,396,619 B1 | 5/2002 | Huibers | |
| 6,396,975 B1 | 5/2002 | Wood et al. | |
| 6,404,943 B1 | 5/2002 | Wang | |
| 6,407,851 B1 | 5/2002 | Islam et al. | |
| 6,414,803 B1 | 7/2002 | Pan et al. | |
| 6,418,247 B1 | 7/2002 | Presley | |
| 6,466,356 B1 * | 10/2002 | Peeters et al. | 359/291 |
| 6,504,644 B1 * | 1/2003 | Sandstrom | 359/291 |
| 6,522,454 B2 | 2/2003 | Meier et al. | |
| 6,552,840 B2 | 4/2003 | Knipe | |
| 6,614,576 B2 | 9/2003 | Strumpell et al. | |
| 2002/0093721 A1 | 7/2002 | Knipe | |
| 2002/0122237 A1 * | 9/2002 | Sandstrom et al. | 359/291 |
| 2003/0002019 A1 | 1/2003 | Miller | |
| 2003/0053186 A1 * | 3/2003 | Arima | 359/224 |
| 2003/0053231 A1 * | 3/2003 | Missey et al. | 359/872 |
| 2003/0076575 A1 * | 4/2003 | Stappaerts | 359/291 |
| 2003/0107794 A1 * | 6/2003 | Siekkinen et al. | 359/291 |
| 2003/0179431 A1 * | 9/2003 | Aksyuk et al. | 359/224 |
| 2003/0184889 A1 * | 10/2003 | Rodgers | 359/872 |
| 2003/0202234 A1 * | 10/2003 | Taylor et al. | 359/291 |
| 2003/0227700 A1 * | 12/2003 | Mizuno et al. | 359/877 |

* cited by examiner

Primary Examiner—Evelyn A. Lester

(57) ABSTRACT

Micromirror systems with concealed multi-piece hinge structures are provided for reflective applications. Generally, light is reflected by these structures adapted for three-dimensional tilt as well as up-and-down or out-of-plane actuation. Devices can be produced utilizing the various optional features described herein to provide miniaturized, highly controllable solutions for use in optical switching, projection and other applications, especially optical applications.

40 Claims, 22 Drawing Sheets

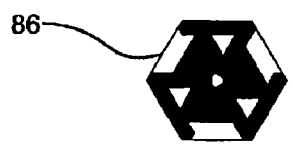
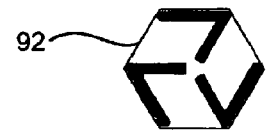
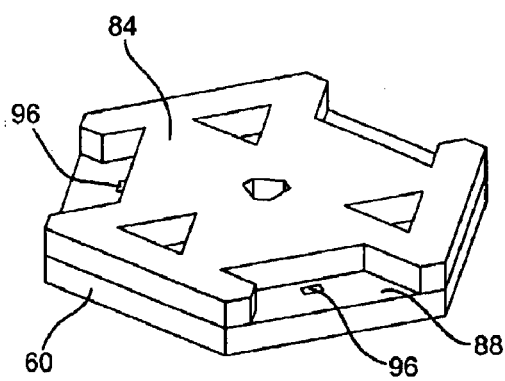
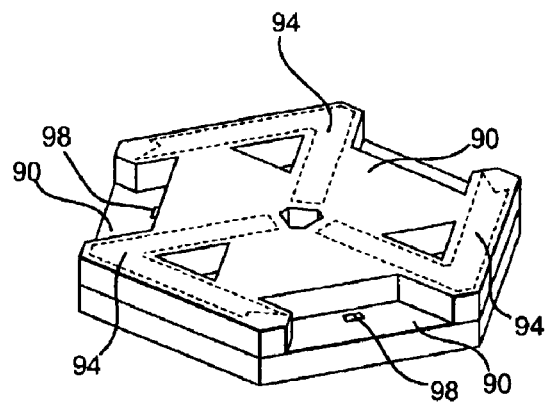
FIG. 5A  FIG. 5B
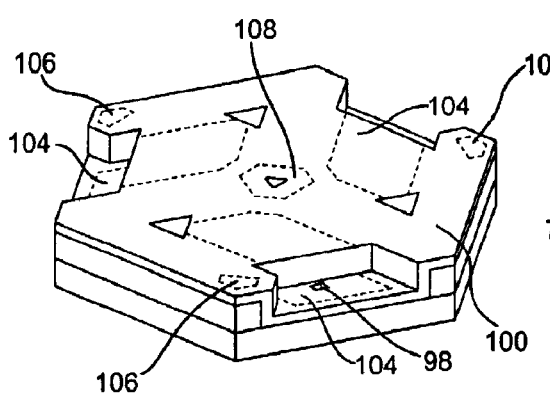
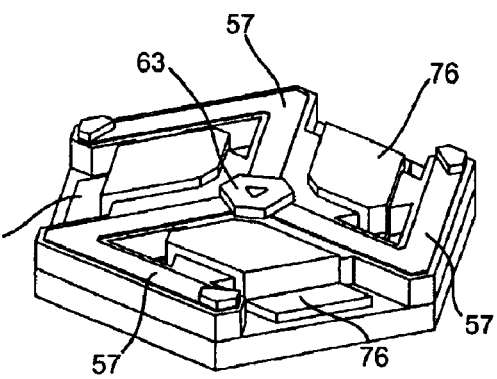
FIG. 5C  FIG. 5D

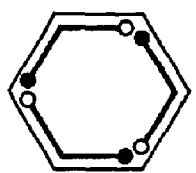
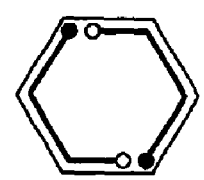
FIG. 15J        FIG. 15K        FIG. 15L
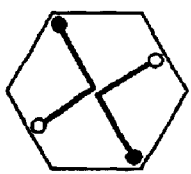
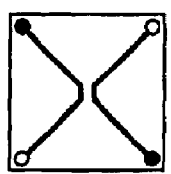
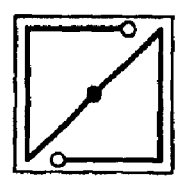
FIG. 15M       FIG. 15N        FIG. 15O
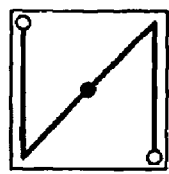
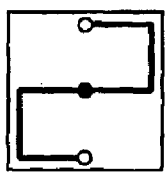
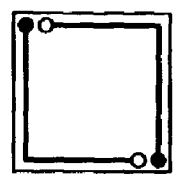
FIG. 15P        FIG. 15Q        FIG. 15R

MICROMIRROR SYSTEMS WITH CONCEALED MULTI-PIECE HINGE STRUCTURES

FIELD OF THE INVENTION

The present invention relates generally to the field of spatial light modulators that can modify or correct an optical wavefront. More particularly, the invention relates to micro electro-mechanical systems (MEMS) in the form of micromirror devices used in adaptive optics, optical switching applications, or other light manipulation applications such as displays.

BACKGROUND OF THE INVENTION

MEMS device s are small structures, typically fabricated on a semiconductor wafer using processing techniques including optical lithography, metal sputtering or chemical vapor deposition, and plasma etching or other etching techniques that have been developed for the fabrication of integrated circuits. Micromirror devices are a type of MEMS device. Other types of MEMS devices include accelerometers, pressure and flow sensors, fuel injectors, inkjet ports, and gears and motors, to name a few. Micromirror devices have already met with a great amount of commercial success.

MEMS micromirror devices are being used in a variety of applications, including optical display systems, optical cross-connects for switching of optical data signals and adaptive optics for phase and other types of correction. One type of display device that has been used with a great deal of success is the Texas Instruments DLP™. In this system, many mirrors are operated individually in a bistable, digital fashion to create a projected display. Although current commercial technology has been limited to about 1.3 million pixels in the mirror array, greater mirror densities and higher yields should improve this in the future as the technology progresses.

Arrays of multi-axis tilting mirrors can also be found in other applications, such as beam steering, printing, scanning, and projection, among many. Most current arrays of micromirrors can be separated into two categories: relatively large single mirrors that steer a single beam, or arrays of smaller mirrors, where many mirrors aim each light beam.

Larger mirrors can offer some advantages when steering a smaller number of discrete light beams in terms of providing an unbroken, nominally flat surface with high reflectivity. However, if the beams are too large for the mirrors, or if they are misaligned, the reflected beam is clipped and has less intensity. These types of arrays are less suitable for reflecting larger, continuous light such as an optical image. Generally, the support structures between actuating mirror elements leave too much space and thus create noticeable holes in the reflected image. Arrays of smaller mirrors also have drawbacks. Many current designs may only move in one axis, which limits some of their potential applications. Others that can move in a multi-axis fashion also often have relatively large gaps from one mirror to the next that affect the quality of the reflected beam or image. Micromirrors set in an array such as this must have some gaps between them to allow full movement of each mirror, but it is advantageous to decrease the size of the gaps as much as possible. In addition, many designs have support structures that are small, yet are part of the visible surface. These can also contribute to the spacing between mirrors. Supports and hinges that are hidden behind the mirror surface would improve the overall reflective surface area.

A particularly important application for multi-axis tilting micromirrors is in the field of optical switching. A typical optical cross-connect for an optical networking switch includes a switching matrix having two arrays or clusters of MEMS micromirrors. The first array of micromirrors is arranged so that micromirrors in the first array receive optical input signals from one or more input sources, such as optical fiber input(s) and the second array of micromirrors is arranged so that micromirrors in the second array receive optical signals reflected from micromirrors in the first array and direct the signals as optical output signals to one or more optical outputs.

The micromirrors in each array are capable of being adjusted, steered or tilted, so that a micromirror in the first array is capable of directing a reflected optical signal to a micromirror in the second array selected from a plurality of the micromirrors in the second array. Similarly, the micromirrors in the second array can be adjusted, steered or tilted so as to align with a micromirror in the first array selected from a plurality of the micromirrors in the first array. Thus, by appropriate orientation of the micromirrors by adjustment, steering or tilting, a first micromirror in the first array can be set to deliver an optical signal to a first, second, or third, etc. micromirror of the second array, as desired, and so forth, thereby providing the switching capability of the cross-connect.

The performance of optical cross-connects that use such arrangements of MEMS micromirrors depends upon a number of factors, including how well the micromirrors in the first array are optically aligned with the micromirrors in the second array, changes in temperature, voltage drifts, and performance of the mirror surfaces of the micromirrors, which are affected by the shape or flatness of the mirror surface. Even under the best circumstances, when the micromirrors in the first and second arrays are accurately aligned and the other factors mentioned above are minimized, current cross-connects often lose 60% to 70% (about 4–5 dB losses) of the light passing through the system.

Although factors such as lost reflection of infrared wavelengths from the mirror surfaces and poor coupling of fiber to lenses play a role in these losses, light scattering and other imperfections in the surfaces of mirrors are also significant factors. There is a current need for improvements in optical switching devices that will reduce the amount of losses in light outputted by such devices when compared with the amount of light inputted thereto.

Further improvements in optical switching devices, as well as in micromirror devices in general would be desirable as regards power consumption. The utilization of large mirrors relative to the size of the light beam can involve rapidly switching high voltages. One avenue for micromirror device improvement lies in continued miniaturization of the devices. In terms of performance, smaller sizes can improve power efficiency since smaller distances between parts and lower mass parts will improve energy consumption. In terms of manufacturing, continued miniaturization of mirror elements offers greater yields for a wafer of a given size.

One other common application of micromirror devices is for adaptive optics and phase correction. Although many types of mirror arrays correct for tip and tilt such as those discussed for optical switches, often correction of phase distortion is more desired. Even though a static correcting mirror shape has its uses, phase distortion is generally dynamic, and thus the mirror surface must be constantly updated. A system such as this generally consists of two parts, which are a wavefront detector and a deformable mirror. A portion of the light being measured in question is split off and directed to a wavefront detector such as a Schack-Hartman sensor which measures tilts of the beam at various spatial positions within the beam, or a similar sensor. Distortions in the light beam can be detected, and feedback correction signals are then sent to a deformable mirror surface to be updated in real time.

A number of designs for the deformable mirror using MEMS have been presented in the last several years. One popular design is that of a single flexible mirrored surface, with many individual actuators that deform the entire surface at each point. Another design is of multiple small mirrors, each operating in a manner similar to a piston, with each individual mirror actuating perpendicularly to the plane of the mirror. One enhancement to this application can be seen in the present invention. Flexible members supporting micromirrors with free ends can allow movement of an entire mirror surface in the vertical direction as well as allowing for tip and tilt. While the overall range of the device limits motion ranges for each of the various types of motion, different types of motion do not interfere with each other, and more than one type of compensation could be done simultaneously.

Various aspects of the present invention offer improvement in terms of one or more of the considerations noted above. Of course, certain features may be offered in one variation of the invention, but not another. In any case, the advances offered by aspects of the present invention represent a departure from structural approaches represented by current micromirror designs.

SUMMARY OF THE INVENTION

The present invention involves micromirror structures, optionally used in adaptive optics or optical switches. Micromirror array devices according to the present invention generally comprise a superstructure disposed over a substructure including addressing features. Features of the superstructure set upon and above the substrate include electrodes, hinges, micromirrors, support members or portions thereof. Support members are provided to hold a mirror/micromirror above the hinge and the electrode features used to actuate it.

The invention involves supporting each micromirror element above its respective hinge portions at or along the sides or corners of the mirror. Deformable hinge members are provided for each mirror that are themselves supported above the substrate by one or more features. The location of supports between the hinge portions and a mirror may vary. Preferred placement locations include opposite corners or sides of the mirrors, and alternating (every-other) corner or side locations. Generally, mirrors will have a polygonal plan in which the shapes are closely-packed (e.g., triangles, hexagons, and quadrilaterals such as squares, rectangles, trapezoids, parallelograms, and rhombi).

In operation, the micromirrors are preferably operated in an analog fashion, although operation in a digital fashion is contemplated. The micromirrors are supported by hinge structures which allow torsion motion and flexure or cantilever motion. Individual hinges will most commonly have a bent shape with substantially straight section or have a curvilinear profile, either of which facilitates both of these types of motions. The structures of the hinges and supports are designed to move in a continuous, controllable fashion simultaneously in at least two separate axes. Certain designs also allow for movement of the mirror perpendicularly to the plane of the mirror in addition to tilt. The bent shape of the hinges which twist as well as move in a cantilever fashion give enough flexibility of motion to let the mirror tilt and move perpendicularly at the same time.

By utilizing side-support features according to an aspect of the present invention, it is possible to produce certain mirror face embodiments that are unbroken by light-scattering or non-reflective features. This approach to mirror and hinge support or attachment described helps maximize available reflective surface area. Further details regarding this approach including other useful design characteristics are described much more extensively in co-pending, commonly owned applications Ser. Nos. 10/269,796 (now allowed); 10/269,763 (now U.S. Pat. No. 6,825,968) and 10/269,478 (now U.S. Pat. No. 6,798,560), each filed Oct. 11, 2002 and each of which is incorporated by reference herein in its entirety.

For instance, in connection with such a side-supported mirror approach, manufacturing techniques are taught in which support precursor regions that are ultimately removed are temporarily located where space is to be opened upon releasing the individual micromirror elements of an array. As such, the space required for effectively depositing/forming support structures is not wasted but falls within space that must be left open anyway in order to allow mirror actuation. In other variations of the invention, more traditional columnar mirror supports formed within "vias" are provided. However, these are still located near the perimeter of a given mirror.

The present invention includes any of these improvements described either individually, or in combination. Systems employing micromirror devices including the improved superstructure form aspects of the invention, as does methodology associated with the use and manufacture of apparatus according to the present invention.

BRIEF DESCRIPTION OF THE DRAWINGS

FIGS. 5A–5G show a process for making the device shown in FIG. 3

FIGS. 15A'–15R' shows a number of corresponding variants to those in FIGS. 15A–15R in which substantially curved hinge sections are employed.

DEFINITIONS

Figure 1:
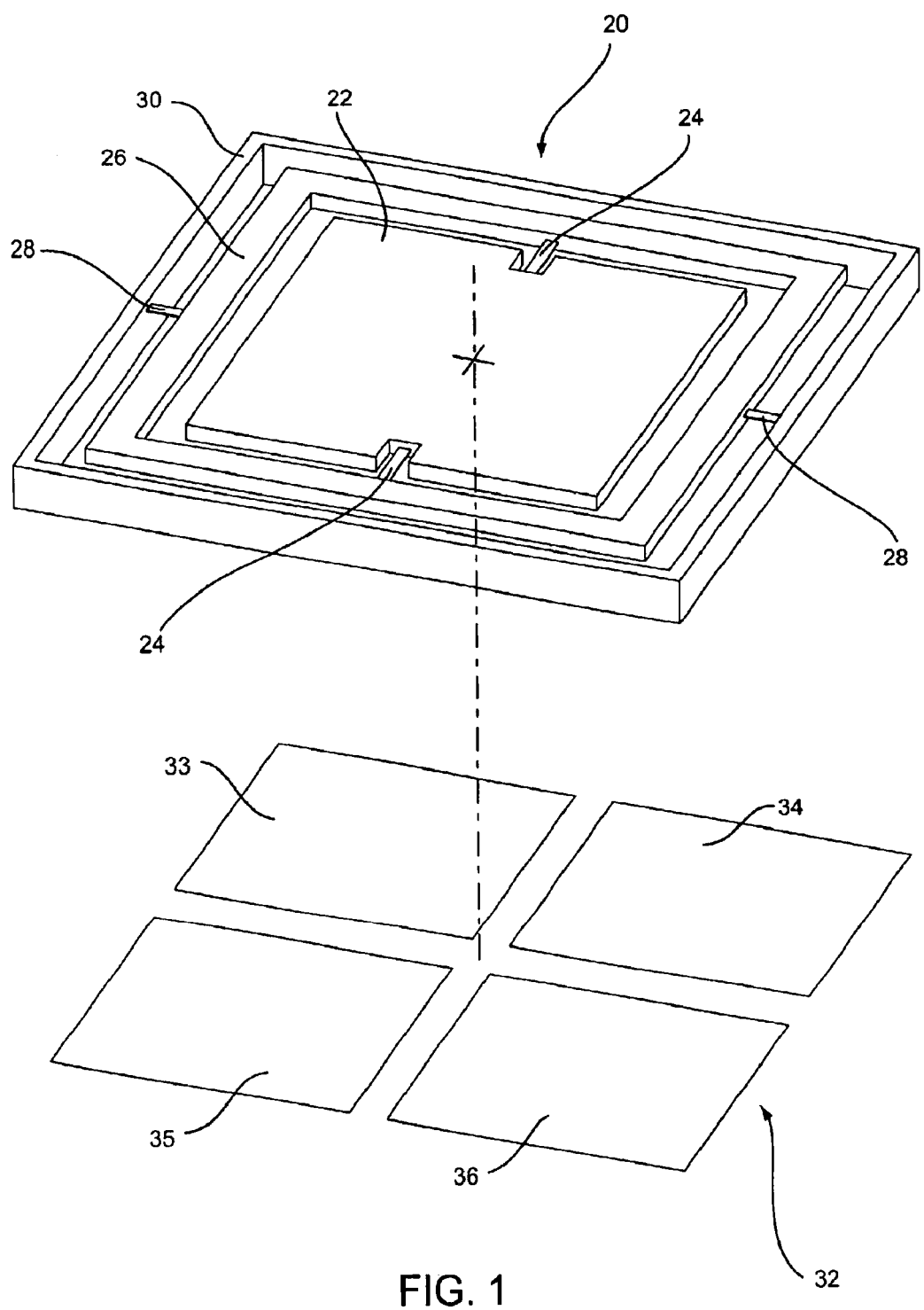
FIG. 1 is a perspective view showing prior art of a generic torsion bar mirror and gimbal assembly.

The phrase "beam steering" refers to operation of one or more micromirror devices in analog mode by charging address electrode(s) to a voltage corresponding to a desired deflection of the mirror to direct or "steer" the light reflected off the mirror in the intended direction.

The term "diameter," is defined herein to mean the distance across any long axis that may be defined. Stated otherwise, the diameter will correspond to that of any circle in which the structure can be circumscribed.

The phrase "dim space" or "dead space" refers to areas or spaces in the reflective surface(s) of a micromirror or micromirror assembly which are not reflective or are poorly reflective.

The term "hinge" refers to a deflectable member or deflectable member segments together (e.g., as formed by/in a single layer of material); the hinge may be elastically deformed in torsion, bending (tension and compression), or in some combination thereof.

DETAILED DESCRIPTION OF THE INVENTION

In describing the invention in greater detail than provided in the Summary above, applicable technology is first described. Following this is a detailed description of exemplary micromirror devices and assemblies according to the present invention, as well as an exemplary process of production. Application of the invention as a programmable lens surface is also discussed. This discussion is followed by description of a known optical switching matrix and its function. Finally, the applicability of the micromirrors of the present invention to optical switch technology, as well as to other fields of adaptive optics such as phase-correction is discussed, along with several additional variants of the invention.

Before the present invention is described in such detail, however, it is to be understood that this invention is not limited to particular variations set forth, as such may, of course, vary. Various changes may be made to the invention described and equivalents may be substituted without departing from the true spirit and scope of the invention. It is also to be understood that the terminology used herein is for the purpose of describing particular embodiments only, and is not intended to be limiting, since the scope of the present invention will be limited only by the appended claims.

Methods recited herein may be carried out in any order of the recited events which is logically possible, unless the recited language clearly indicates otherwise. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Also, it is contemplated that any optional feature of the inventive variations described may be set forth and claimed independently, or in combination with any one or more of the features described herein.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a micromirror" includes a plurality of such micromirrors and reference to "the input" includes reference to one or more inputs and equivalents thereof known to those skilled in the art, and so forth.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Turning now to FIG. 1, a common type of multi-axis mirror is shown in simplified form; this type of design should be well known to those who have ordinary skill in the art. This is a mirror/gimbal device, and works by electrostatic attraction of the mirror to four individually controlled electrodes placed underneath the mirror surface. Restoring force to bring the mirror back to a central position and stabilize it at many intermediate positions is provided by torsion bars. FIG. 1 shows a single multi-axis mirror 20, consisting of a mirror surface 22 connected via two torsion bars 24 to a frame acting as a gimbal 26 that allow rotation around the Y axis. The frame 26 is in turn connected by two more torsion bars 28 to a stationary base 30. The frame and mirror assembly may then rotate around the X axis. Four electrodes 33–36, set in an array 32 can then be charged to various voltages to allow analog control of the position of the mirror in both axes. For instance, if electrode 33 is charged to a given voltage while electrodes 34, 35, and 36 remain uncharged, the mirror will rotate in both axes toward that electrode. By careful control of the voltages of each electrode, nearly any angle within the range of the device can be set on one particular mirror, as the two axes of motion are able to rotate independently.

This style of micromirror is most often used to direct or steer a single beam of light, and is thus relatively large, that is on the order of 1×1 mm. Gimbal 26 only moves in one dimension, and the base 30 does not move at all, which makes these portions of the mirror unsuitable for control. In the figure, the gaps between mirror, gimbal, and base have been exaggerated for clarity, but still must exist to allow free movement of the constituent parts. In an array of mirror assemblies 20, a large percentage of the total surface of the matrix is unusable.

Figure 2:
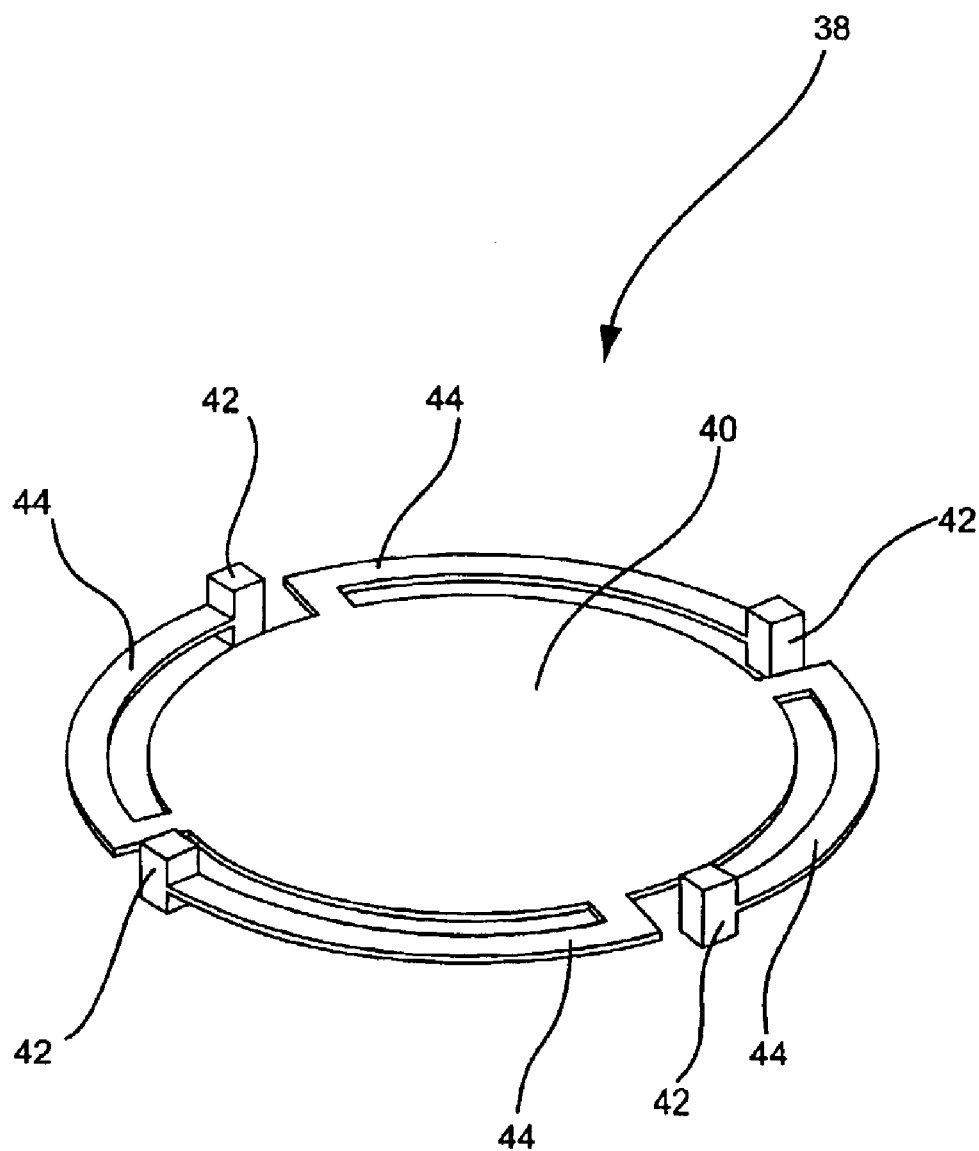
FIG. 2 shows a top view of prior art showing a single mirror using flexure hinges as part of an optical switching array.

FIG. 2 shows a different style of known micromirror 38 shown here in a simplified form. In this design, a mirror 40 is attached to a stationary base (not shown) via four posts 42 by rotationally symmetric flexure bars 44 (in this case, four-fold rotational symmetry). Here the primary restoring force is experienced in terms of cantilever-action as opposed to torsion, but the primary axes of movement are the same as the mirror shown in FIG. 1. The mirror is mounted over an electrode array 32 similar to that shown in FIG. 1. Once again, this type of mirror is designed to aim a single beam of light, so there is a significant amount of dead space between different mirrors used for the flexure bars and other parts of the stationary frame. Even for aiming discrete beams however, it would be advantageous for either of the systems shown in FIGS. 1 or 2 for this dead space to be substantially reduced or eliminated. When packed in an array, mirrors such as this can direct hundreds of beams at once. With less dead space between mirrors, a greater number of beams could be switched with the same device, as the controllable angle for each mirror is limited.

Figure 3A:
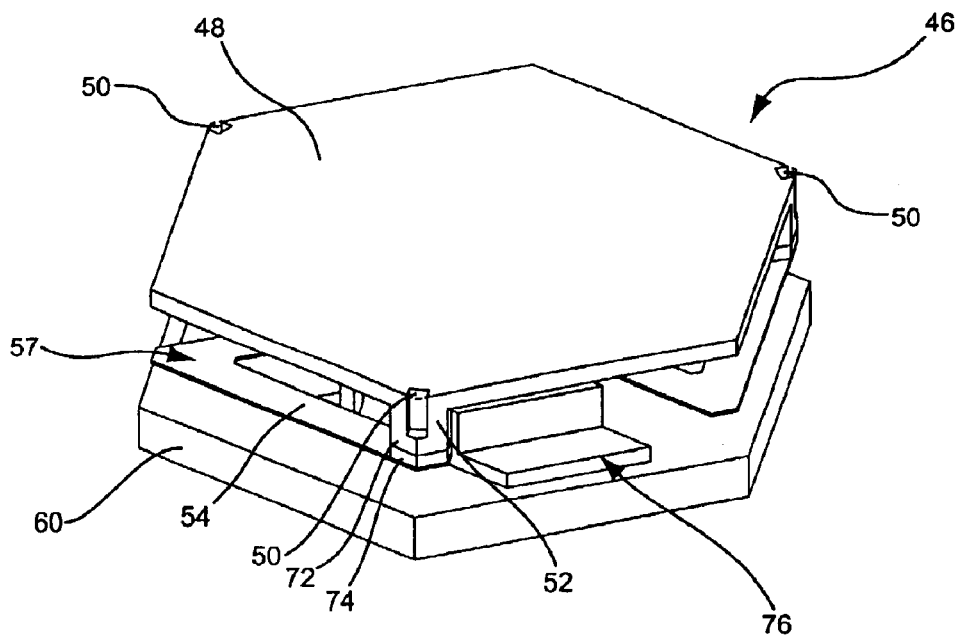
FIG. 3A shows a perspective view of the present invention in its preferred embodiment.

FIG. 3A shows a perspective view of a single micromirror device 46, which will be referred to for purposes of describing techniques for making the devices according to the present invention. The details of the materials employed, intermediate preparation steps and further constructional details associated with the methodology described are known by those with skill in the art, within the scope of reasonable experimentation by the same and/or may be appreciated by reference to the Background section noted above or the following U.S. patents: U.S. Pat. No. 5,083,857 to Hornbeck, entitled "Multi-level Deformable Mirror Device"; U.S. Pat. No. 5,096,279 to Hornbeck, et al., entitled "Spatial Light Modulator and Method"; U.S. Pat. No. 5,212,582 to Nelson, entitled "Electrostatically Controlled Beam Steering Device and Method"; U.S. Pat. No. 5,535,047 to Hornbeck, entitled "Active Yoke Hidden Hinge Digital Micromirror Device"; U.S. Pat. No. 5,583,688 to Hornbeck, entitled "Multi-level Digital Micromirror Device"; U.S. Pat. No. 5,600,383 to Hornbeck, entitled "Multi-level Deformable Mirror Device with Torsion Hinges Placed in a layer Different From the Torsion Beam Layer"; U.S. Pat. No. 5,835,256 to Huibers, entitled "Reflective spatial Light Modulator with Encapsulated Micro-Mechanical Element"; U.S. Pat. No. 6,028,689 to Michalicek, et al., entitled "Multi-Motion Micromirror"; U.S. Pat. No. 6,028,690 to Carter, et al., entitled "Reduced Micromirror Mirror Gaps for Improved Contrast Ratio"; U.S. Pat. No. 6,198,180 to Garcia, entitled Micromechanisms with Floating Pivot"; U.S. Pat. No. 6,323,982 to Hornbeck, entitled "Yield Superstructure for Digital Micromirror Device"; U.S. Pat. No. 6,337,760 to Huibers, entitled: "Encapsulated Multi-Directional Light Beam Steering Device"; U.S. Pat. No. 6,6,348,907 to Wood, entitled "Display Apparatus with Digital Micromirror Device"; U.S. Pat. No. 6,356,378 to Huibers, entitled "Double Substrate Reflective Spatial Light Modulator"; U.S. Pat. No. 6,369,931 to Funk, et al, entitled "Method for Manufacturing a Micromechanical Device"; U.S. Pat. No. 6,388,661 to Richards, entitled "Monochrome and Color Digital Display System and Methods"; U.S. Pat. No. 6,396,619 to Huibers, et al., entitled "Deflectable Spatial Light Modulator Having Stopping Mechanisms." In any case, micromirror devices according to the present invention may be produced and/or operated according to the same details or otherwise.

Figure 3B:
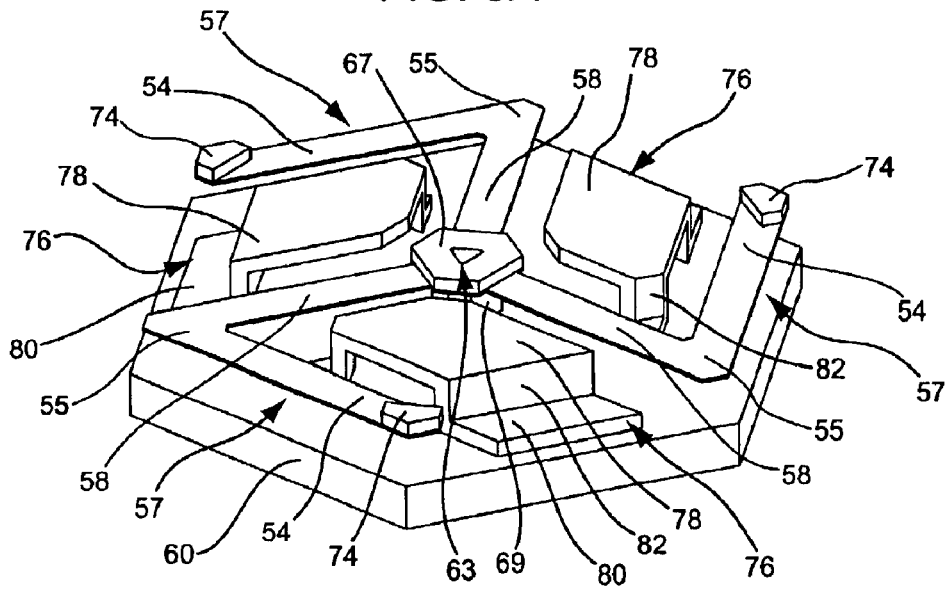
FIG. 3B shows the same views as FIG. 3A but with the mirror removed.
Figure 3C:
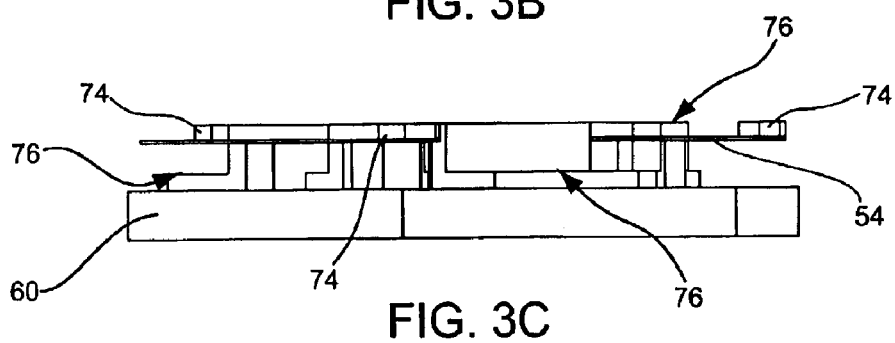
FIG. 3C shows the same element from as a side view.

Regarding the features of the present invention, FIG. 3A shows a micromirror device 46 according to the present invention. FIG. 3B shows the micromirror device 46 minus its mirror 48. FIG. 3C shows the same device pictured in FIG. 3B in side view. The mirror surface 48 shown in FIG. 3A is uninterrupted, thereby providing superior reflection characteristics. While the "potential face" of the mirror surface 48 (indicated by solid and dashed lines together) may be somewhat larger than the actual face of the mirror (the area indicated by solid lines alone) reflection losses occurring from "dim" or "dead" space resulting from gaps 50 and the spaces between the individual micromirror devices 46 in an assembly of devices 46 is more than compensated for by the ability to orient the individual devices to direct light that would otherwise be lost due to scatter, misalignment, etc., as discussed above. Further, as described below, the "dim" or "dead" space resulting from gaps or openings 50 may be minimized or even eliminated according to an aspect of the present invention with careful design of the mirror supports 52.

As an alternative to the mirror supports 52 shown, columnar supports or posts (not shown) may be utilized which may be created by filling in vias produced in sacrificial material. Supports may have a wall at the edge of mirror (each may have four walls or more or may define curved surfaces— depending on the original via shape that is filled-in to create the structure). Yet, the supports may be inset from the side/corner or edge of a mirror (depending on the style of micromirror device chosen) to which they are closest. However, it may be preferred to position the supports in such a way as to maximize hinge or torsion member length in view of the mirror style/format selected (i.e., square with corner support positions, hexagonal with corner supported positions, hexagonal with side support positions, etc.). In which case, the base of each support (or an intermediate structure) will be positioned at the end of any hinge portions. Further details about these support variations can be found in co-pending, commonly owned applications Ser. No. 10/269,796 (now allowed), entitled "Micromirror Systems with Side-Supported Mirrors and Concealed Flexure Members," incorporated by reference, in its entirety, above (e.g., see FIG. 9A' in that application).

However constructed, in the variation of the invention shown in FIGS. 3A–3B, the location of the mirror supports are placed equidistant from one another, forming (in a sense) an equilateral triangle. Accordingly, their location is symmetric along three mirror planes coincident with mirror 48 (i.e., they offer three-way symmetry). Another way of looking at the arrangement is that the supports are present on alternating corners. As such, opposites of the mirror have no support counterpart (supports are inopposite one another).

In certain other variations of the invention pictured (e.g., in FIGS. 4A–4B), each of a pair of supports is actually positioned opposite one another and across the body of mirror 48. Advantageously, the support positioning produces bilateral symmetry. Equidistant placement about the mirror face is again preferred. In any case, equal spacing or providing some measure of symmetry offers greater predictability in control for various modes of mirror actuation (i.e., it produces substantially equivalent behavior). For the same reasons(s) a measure of rotational symmetry in hinge structure is often desired—as is apparent in the figures embracing aspects of the present invention.

Moving on with further details of the invention, one such aspect concerns the manner in which mirror 48 is attached to its hinge. Supports 52 on several sides of mirror element 48 secure it to hinge portions 54 of an overall hinge 57. Hinge portions 58 are attached to substrate 60 by a central hinge joint 63 that underlies a portion (the center, in the example shown in FIG. 3B) of the mirror element 48. Each hinge 57 (formed by portions 54, 55 and 58) is provided in a single piece of metal, constrained in the center to act as three separate flexure pieces or deformable member portions. A base 72 of each support 52 may directly connect each hinge portion 54. Alternatively, an intermediate layer or nub 74 of material (e.g., serving as a bonding interface) may be employed. In any case, the hinge elements are hidden or concealed beneath the mirror.

Hinges 57 are elevated above substrate 60 to permit torsion and cantilevered flexure about portions 54 and/or 58 as the mirror element 48 is tilted or rotated about various axes. The two portions 54 and 58 of each hinge are connected at a bend 55 that allows greater movement and flexibility. Although other types of central support are possible, hinge joint 63 is a via-type support structure, preferably open underneath the hinge center 67, except for a central post 69. The distance the hinges are set above the surface of substrate 60 may be as little as about 0.1 micron, or less.

As to the separation between the hinge portions and the underside of mirror 48, this may—likewise—be as little as about 0.1 micron, or less. Hence, the mirror of each micromirror device or element to be provided in an array or otherwise may be located as little as about 0.2 micron, or less, above the surface of substrate 60.

Avoidance of a central yoke to hold the mirror structure (as in known devices produced by Texas Instruments) allows creation of very low profile micromirror devices by the invention that are still able to attain high deflection angles (typically about +/−10 deg., even upwards of about +/−15 deg., to about +/−20 deg. or more). Of course, mirror/micromirror devices according to the present invention may be advantageously manufactured on a larger scale (even using MEMS techniques)—possibly utilizing other actuation techniques, including electromagnetic, electrostatic, thermo-mechanical or piezo-based approaches.

An aspect of the invention that facilitates provision of adequate electrostatic attraction in response to hinge restoring forces that increase with angular deflection has to do with the configuration of electrodes 76. The electrodes may be configured with a plurality of portions 78 and 80 (or more) at different levels. Whether provided in a series of steps by continuous or contiguous members (as shown with a support portion 82 between each stage 78/80), by steps formed with discrete members or a continuous angled member, the electrodes are configured so that portions further from the center or point of rotation of the mirror are at a lower level. In this configuration, all three electrodes 76 are of identical shape. Similar electrode shape and area simplify the process of actuating a multi-axis mirror system, but other configurations of electrode shapes and sizes, including asymmetric variants are possible. In this case, there is a plurality of base portions 80 for each electrode for added structural stability, although a singular base portion 80 may be preferred.

The electrode configuration shown with higher portions closer to the center of the mirror or overall device and lower portions more distant therefrom provides clearance for the mirror as it is tilted at an angle. Furthermore, the configuration provides for sequential attraction of mirror 48. When the mirror is angled away from a set of electrodes, the upper electrode portion is the first to exert significant attractive electrostatic force on the mirror (in light of the inverse squared relationship between electrostatic attraction and distance between objects). As the upper electrode portion(s) effectively attract the mirror drawing downward (i.e., towards the upper electrode portion), the influence of the electrode lower portion(s) increases as the distance between the lower portion(s) and the mirror decreases. Further aiding attraction of the mirror to its full angular displacement is the increased mechanical advantage or lever arm offered at more remote regions of the mirror interacting with lower electrode portion 80. This and other variants of possible electrode shapes are explored more fully in application Ser. No. 10/269,763, entitled "Micromirror Systems with Electrodes Configured for Sequential Mirror Attraction," which is incorporated by reference herein in its entirety.

Device 46 is actuatable to move in a plurality of axes. One difference of the present invention is one of scale. Advantageously, the scale of the present invention may be made much smaller than currently available micromirrors, with the diameter of each mirror element being on the order of magnitude of 10–20 microns, or more. An array of hundreds or thousands of these micromirrors may be used to replace a single mirror element as shown in FIGS. 1 and 2. A greater number of micromirrors for each portion of the incoming wavefront provides for much more customization of the properties of the outgoing wavefront. Miniaturizing the individual mirror size carries a number of other benefits that will be detailed later. Nevertheless, it is contemplated that the size of the mirror diameter may be increased to as high as about 1 mm or more, with dimensions of the other components of the device having increased dimensions in proportion thereto. This would allow a single mirror element of the present invention to effectively control an entire light beam.

In the configuration shown in FIG. 3, the hinges are supported on the substrate at the center of the device. FIG. 4 shows another highly advantageous design, but with the hinges being supported on the outside of the device. The features of this mirror assembly 47 are displayed similarly to that of FIG. 3. Many of the same features are present, but are connected in a different fashion. In this variation, the base and mirror are square, although a hexagonal or other shape would also work with this type of hinge structure.

As in FIG. 3, FIG. 4 shows a mirror 48 connected to a hinge portion 54. The other end 58 of each hinge portion 57 is connected to a hinge joint 62. Similar to FIG. 3, the hinge portions 54 and 58 are connected by a bent portion 55. As compared to device 46 in FIG. 3, in device 47, hinges 57 are physically separated.

Hinge joints 62 are bridge-type support structures, preferably open underneath the hinge center 64, which is attached to a spanning segment 66 between vertical support segments 68. Feet 70 may additionally be provided to stabilize the support structure. Yet another option is to produce support segments 68 at an angle relative to the surface of the substrate (i.e., having both vertical and horizontal components). Features of the electrodes 76 are essentially equivalent to those as presented in FIG. 3.

Each of the designs presented in FIGS. 3 and 4 are connected differently, but they both offer much of the same function. Both are designed to tilt in a plurality of axes simultaneously in a manner similar to that shown in U.S. patent application Attorney Docket No. EXAJ-003, entitled, "Multi-tilt Micromirror Systems with Concealed Hinge Structures," filed on even date herewith and incorporated by reference. Yet, because the hinges have been designed to allow both torsion and cantilever, they are also flexible enough to easily permit movement of the mirror in the direction perpendicular to that of the plane of the mirror surface. By providing for multi-axis tilt and vertical motion (relative to the substrate) the devices according to the present invention allow for correction of both tilt and phase as discussed below.

Further differences between the center-supported and end-supported hinge structures in aspects of the invention (e.g., as in FIG. 3 vs. FIG. 4) concern deflection angels as may be obtained for each given configuration. Namely, use of a central support clear regions otherwise occupied by hinge supporting structure. Accordingly, greater deflection angels can be achieved for central-supported devices than end-supported devices of the same thickness (mirror height).

The manner in which a micromirror device 46 according to the present invention may be produced is illustrated in FIGS. 5A–G. Of course, the process steps employed will vary depending on which inventive features are actually employed in a given variation of the invention, as would be readily apparent to those of ordinary skill in the art.

In FIG. 5A, a sacrificial layer of material 84 is set upon substrate 60. It is patterned with a first mask 86 to define a substrate-level portion 88 upon etching. In FIG. 5B, a hinge metal layer 90 is deposited over the entire surface including a portion of the sacrificial layer. A second mask 92 is utilized in defining a passivation layer (not shown) over the region(s) of layer 90 serving as a hinge precursor region 94. Metal layer 90 fills in vias 96 provided in substrate 60 to form a connection 98 between underlying address circuitry beneath an oxide layer of the substrate. The same approach to addressing and substrate construction may be employed as described above, or another manner of electrical control of device superstructure produced may be utilized. This holds true with respect to connectivity between the device elements as well as the configuration of substrate 60.

As shown in FIG. 5C, a thicker layer of conductive material 100 is deposited over the hinge material. This layer builds-up the electrodes 76 and nubs 74, and hinge support 63 for hinge portions 57. Layer 100 also further fills in via 96 and connecting structure 98. A third mask 102 is employed to define a protective layer (not shown) over the region of layer 100 serving as electrode precursor(s) 104, nub precursors 106, and hinge support precursor 108.

Figure 5E:
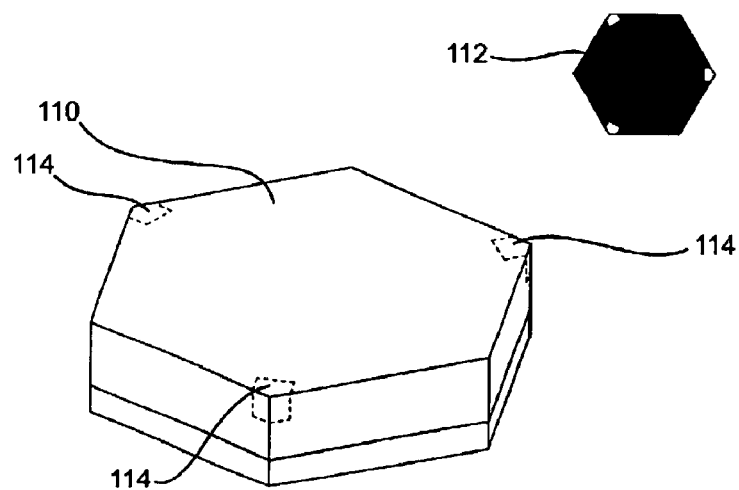

In FIG. 5D, layers 90 and 100 are shown selectively etched to reveal hinges 57, hinge joint 63, and electrode portions 76. In FIG. 5E, one can see another sacrificial layer 110 which then covers these structures. A fourth mask 112 is used to pattern sacrificial layer 110 to form mirror support precursor regions 114 upon etching the sacrificial layer.

Figure 5F:
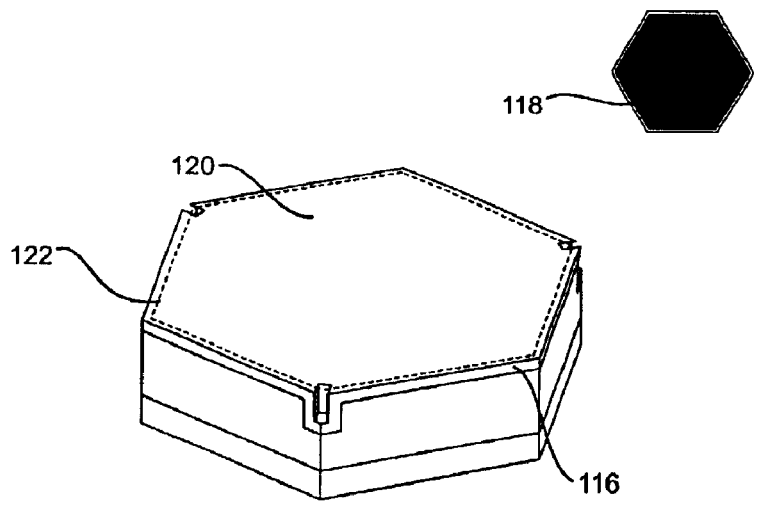

FIG. 5F shows sacrificial layer 110 as it is selectively etched, and then coated with a layer 116 of conductive material suitable to serve as a mirror (or a substrate that may be subsequently coated with a highly reflective metal or dielectric material). A fifth mask 118 is used in order to define a passivation layer over mirror precursor regions 120 to be retained, but not the adjacent borders 122, which are removed to form spaces between adjacent micromirrors 46.

Figure 5G:
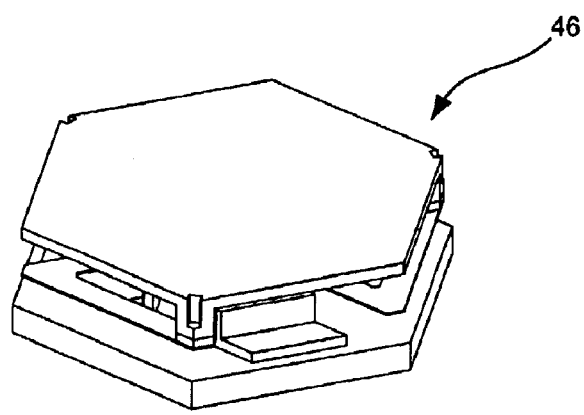

FIG. 5G shows a micromirror element 46 according to aspects of the invention after all sacrificial materials have been removed. As discussed above, the mirror is supported at or along its opposite sides or edges by supports attached to a hinge, which is in turn supported above the device substrate. In addition to being placed at various sides/portions of the mirror, the support members may be characterized as being "open" in nature. Progressive or dual-stage electrodes are shown as well.

Figure 6A:
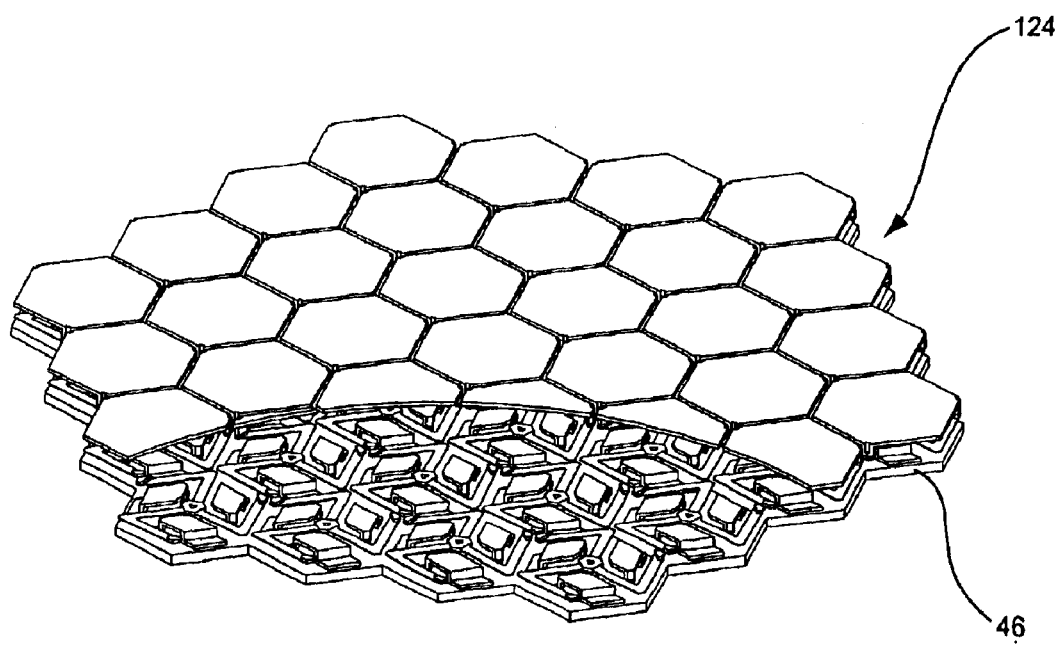
FIG. 6A is a perspective view of a sample 7×7 array of mirrors shown in FIG. 3 with some of the mirror tops removed.

FIG. 6A shows an exemplary array assembly 124 of micromirrors 46 in a seven across arrangement. Part of the tops of the surface of the mirrors 48 have been removed to show the underlying structures. This type of mirror array, comprised of potentially millions of individually controlled mirrors, can be used for a number of applications. Not only can the micromirrors 46 of assembly 124 be positioned to mimic a tilting of micromirror device 20 about its tilt axes (or some combination of both) and thus represent a flat reflective surface, but the micromirrors 46 can be independently positioned to form a "smart surface" (i.e., one that can be adapted to modify the shape of a reflected wavefront, in response to a given wavefront that is made incident thereon). For this reason, assembly 124 can be described as a "Fresnel mirror" or a "programmable lens". FIG. 6A can also be seen or regarded as only a small section of a much larger array having a million such mirrors or more. Of course, array size will vary upon choice of application and the number of mirrors reference is in no way intended to be limiting.

Array 124 as shown in FIG. 6A has some advantages because of its simplicity in layout. Additionally, addressing for this layout would be consistent for each mirror element 46. A similar array of mirrors can be made from device 47 shown in FIG. 4, with each mirror element being set in the same orientation in a square array.

Figure 6B:
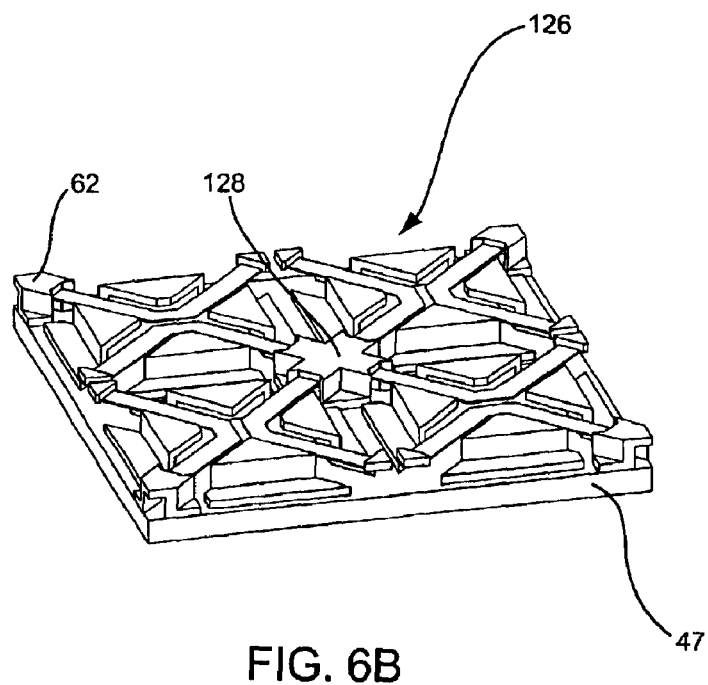
FIG. 6B shows a smaller portion of a similar array of FIG. 4 in its preferred configuration.

However, it may be preferred to use a different layout of mirror elements 47 as shown in FIG. 6B. Here, a smaller 2 by 2 section of a slightly different array 126 is displayed. In this configuration, the devices 47 (shown without their mirror top as in FIG. 4B) are unchanged, but the orientation of the elements 47 varies. Every other mirror element 47 is rotated by 90° in a checkerboard pattern. The main advantage is seen in the position of the hinge supports 62, for which each support 62 meets at a corner with three other supports 62 to make one large support 128 common to the adjacent deformable hinge portions. Large support 128 reduces the number of discrete features to be manufactured, and offer greater structurally stability than individually manufactured supports 62. In addition, because the structure shown in FIG. 6B is a combined structure (as opposed to four free standing elements), the overall dimensions of the support can be made smaller, which can lead to longer hinges and more mobility of the hinge.

Micromirror arrays 124 or 126 provide great versatility in their ability to form surfaces for performing wavefront correction/shaping, and by their ability to be oriented to form other than flat surfaces, including configurations which form effective programmable lenses. Examples of such configurations are shown schematically in FIG. 7A–E. FIG.

Figure 7A:
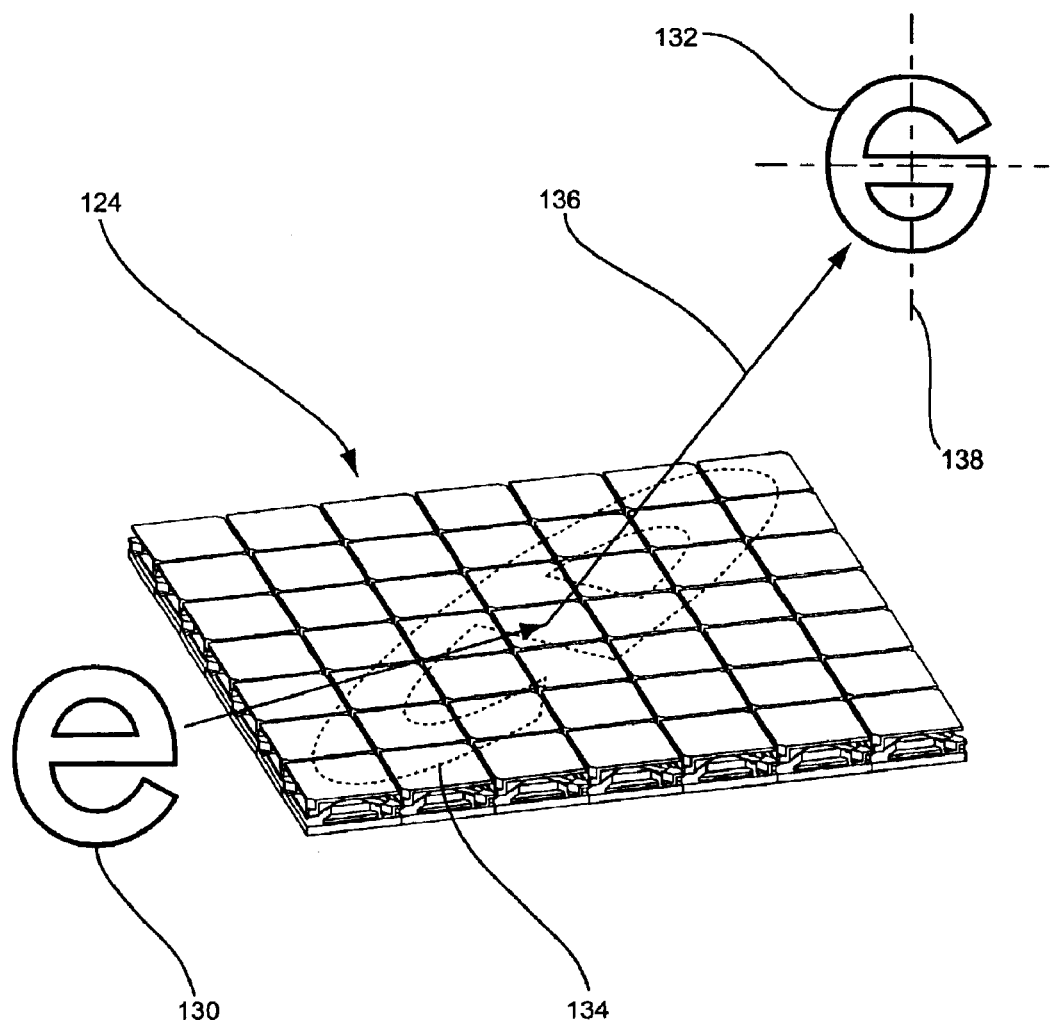
FIGS. 7A–7E are perspective views showing a larger array of FIGS. 6B used as a programmable "Fresnel mirror."

7A displays an array similar to the same array assembly 126 as seen in FIG. 6B. For illustrative purposes, a lowercase "e" 130 is used as a sample object to be reflected off mirror assembly 126. The image 132 results from the particular configuration of the micromirrors. A dotted line 134 portrays where the "e" is reflected on the mirror surface, and the path of light follows an arrow 136. In FIG. 7A, the array is set completely flat, so there is little change in the image other than simple reflection. For comparison to later figures, the image 132 is set against a reference set of crosshairs 138.

Figure 7B:
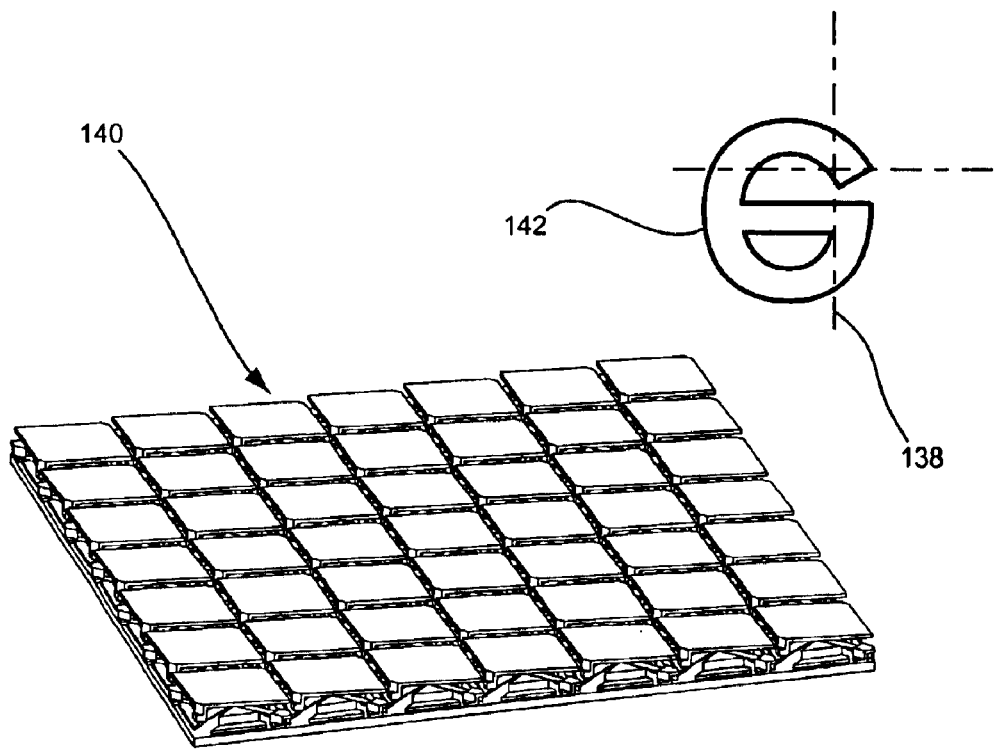
Figure 7C:
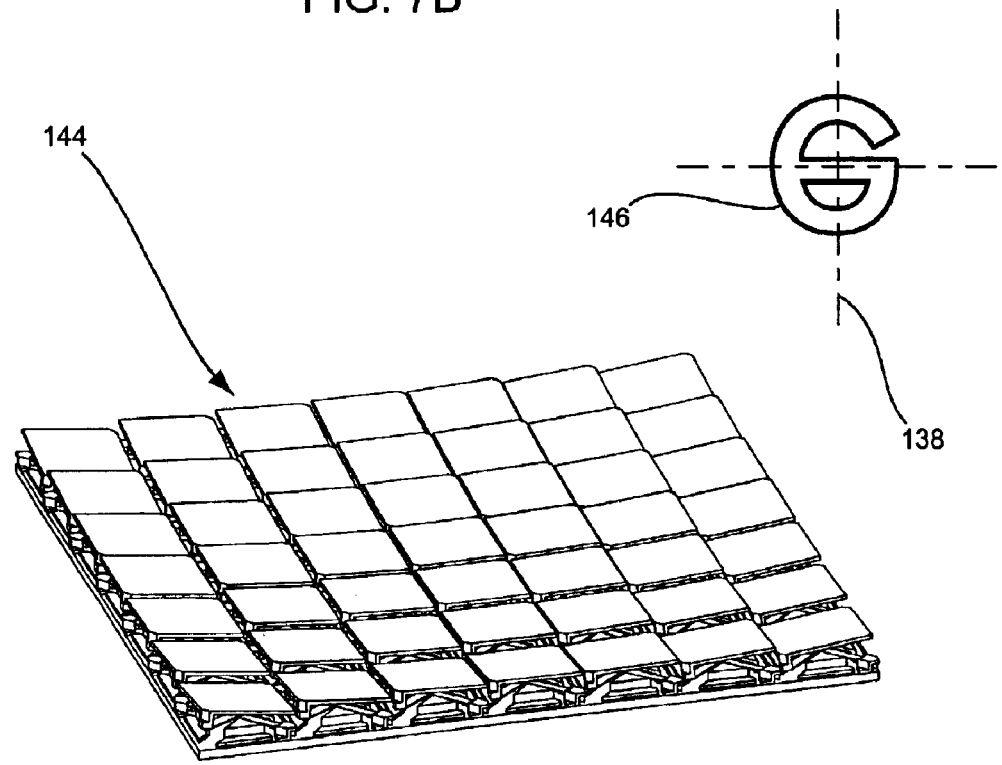

For simplicity, FIGS. 7B–E will all use the same object 130 as seen in FIG. 7A, which will be omitted in these figures. Only the final image 132 will be shown. FIG. 7B shows mirror array 140, which is the same array as 126, but with all of the mirrors tilted in the same direction. The image 142 size is unchanged, but its position has moved. Thus the array 140 acts here as a tilting flat mirror. FIG. 7C displays an array 144, once again the same array 126, but this time individual elements 47 are tilted to approximate the surface of a focusing mirror, as can be seen in the resulting image 146, shown having a reduced size.

Figure 7D:
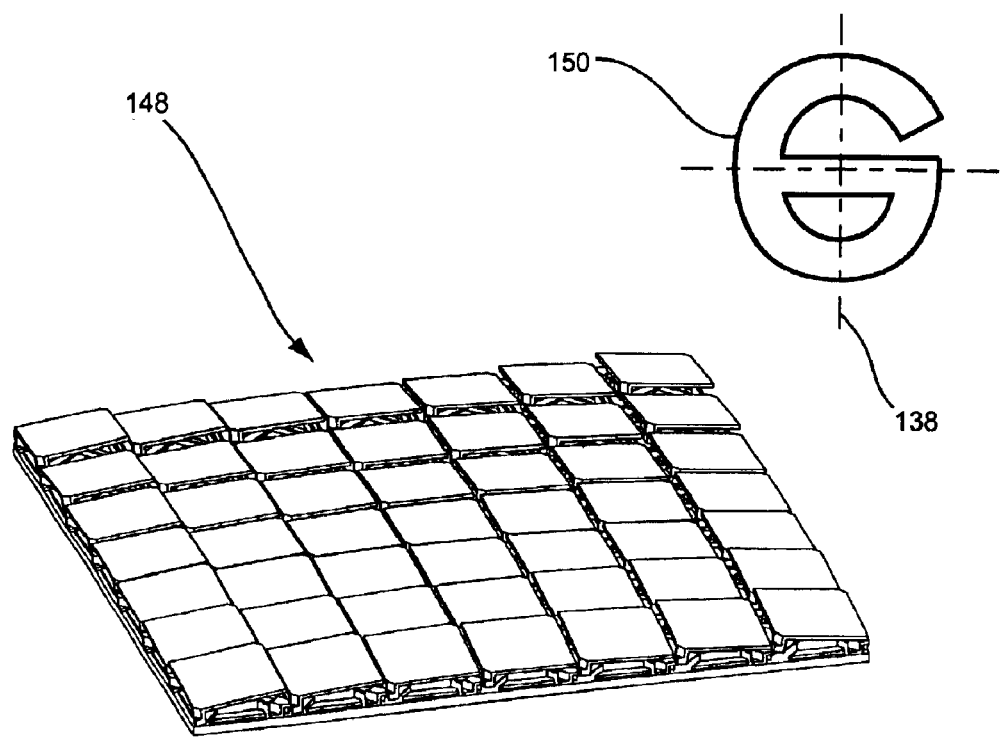
Figure 7E:
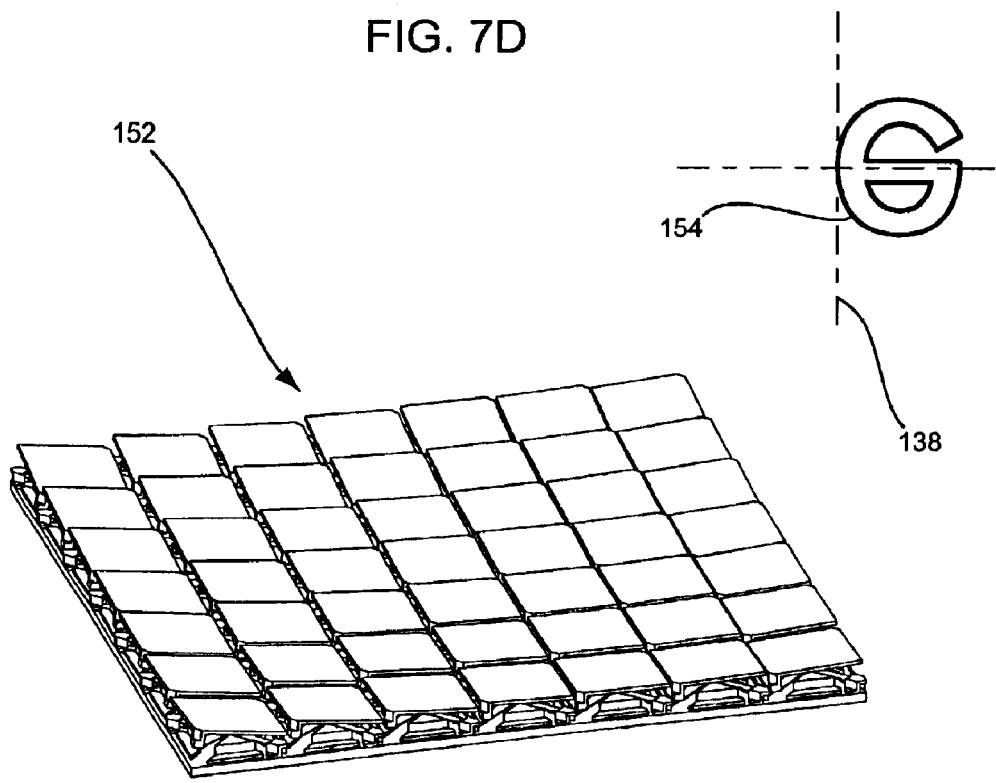

FIG. 7D shows a similar array 148 that is now set with mirror elements 47 approximating a defocusing mirror, which again can been seen in a correspondingly larger image 150. In FIG. 7E, array 152 displays both tilt and focus on the same set of mirrors, with the results showing up in image 154. Because each mirror element can be set independently of each other, potentially several types of correction could be implemented simultaneously. Although tilt and focus can be addressed on the same set of mirrors, there are some important limitations. Depending on the dimensions of the components, tilt angles of individual mirrors might be only as much as 10° in each axis. However, tilt angles of some designs may be as large as 20° or more. If a set of mirrors is tilted acting as a flat mirror so that all of the mirrors are near or at their maximum angle, it will not be able to further focus or defocus the beam. In addition, tilting of curved surfaces can lead to astigmatism in the reflected beam, although this can be corrected by careful shaping of the programmable lens at the specified angle.

Although they are not shown here, many other types of wavefront shaping are possible. Various types of lenses other than spherical can be created, such as cylindrical or parabolic mirrors. Distortions in the incoming beam due to imperfections in earlier surfaces can be detected and corrected. Any number of other surfaces can be created subject to the angular limitations of the micromirrors.

In practical use, such a small subset 126 (or 124) of a much larger mirror array would not be used for shaping beams or images, but this size is used here for illustrative purposes. The mirrors in a somewhat larger portion of the array shaped in this manner would not be seen as clearly to have a curvature because the differences from one mirror to the next would be slight. One advantage to the independently addressable nature of these mirrors is that the array as a whole can be divided into many fields, each with their own properties. One simple way to accomplish this is to use a defined grid, where the center of each subsection of the grid is set to be the center of a programmable Fresnel mirror, each with its own focal length and tilt angle. The present invention is not limited to this manner of controlling the micromirrors. Any arbitrary number or shape of field may be independently controlled.

Another important application of the present invention is in the area of switches for optical networking. Looking at FIG. 8, a schematic representation of a switching matrix 154 is shown. For simplicity of explanation and drawing, only a linear matrix 154 is shown, although two-dimensional matrices are also commonly used. The matrix of FIG. 8 includes two arrays 156, 166 of steerable micromirrors (158, 160, 162 and 168, 170, 172, respectively). Each of the micromirrors are "steerable" by their operation in analog mode, which involve actuation of micromirrors 158, 160, 162, 168, 170, 172 to a voltage corresponding to a desired deflection of the mirror surface of the micromirror, as is known to those of ordinary skill in the art.

In this way, each of the three micromirrors 158, 160, 162 can be tilted about an axis of rotation so as to direct an optical signal received from its input channel (163, 164, 165 respectively) toward any one of micromirrors 168, 170, 172 that corresponds to the output channel 173, 174, 175 that is desired to be outputted to. Input and output channels are often optical fibers with focusing optics. For example, micromirror 158 can be oriented to reflect an input signal received from input channel 163 to micromirror 168, which, in such instance, is also tilted to optically couple the output from micromirror 158 with optical output fiber 173. Alternatively, the voltage can be varied to the electrode(s) of micromirrors 158 and 172 so that they are optically coupled with one another in which case the optical input from optical input fiber 163 is outputted to optical output fiber 175, and so forth. U.S. Pat. No. 6,389,190 describes a switching matrix of the type shown in FIG. 8 in detail, including an example of MEMS micromirrors that may be employed in the construction of such a switching matrix.

As noted in the Background section of the present application, currently available optical switching mechanisms experience a significant loss of the optical signals passing from an input to the output thereof, i.e. on the order of a 60% to 70% loss. Significant contributions to these losses are due to scatter of light from the light signal as it passes from an input optical fiber to first and second mirrors (in input and output mirror arrays) and finally to an optical output fiber. Aberrations in the surfaces of the micromirrors on the input and output arrays can contribute to the scattering of light as well as to deformation of the light beam to the extent that a portion of the light beam can become misaligned with the output optical fiber by the time that the input optical signal (light beam) has been reflected off an input side micromirror and an output side micromirror. Misalignment of the fibers to the mirrors can be a significant source of loss, in addition to loss coupling into the output fiber due to mismatched beam sizes.

Figure 8:
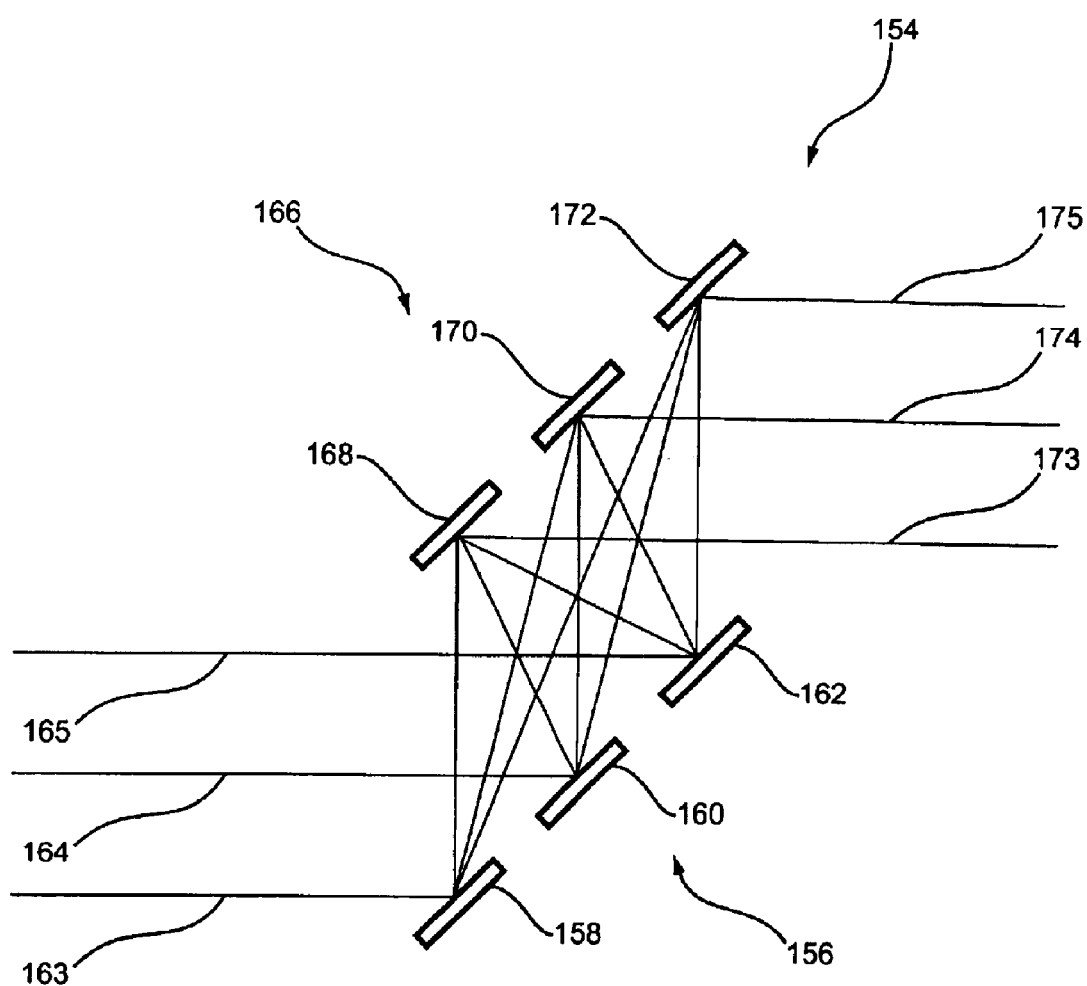
FIG. 8 is a top view of a simple linear 3 by 3 optical switch showing the mirror elements and light beams.

Another source of error can be created if the tilt axes of the input and output mirrors are not parallel in an arrangement such as shown in FIG. 8, although this primarily affects only arrays of mirrors that only have a single axis of movement. In such a case, opposing input and output mirror surfaces of input and output side micromirrors, which are intended to be aligned to optically couple an input optical fiber and an output optical fiber, can never be aligned in parallel, which results in a skewing of the optical beam such that a portion of the output signal does not enter the output optical fiber. Similar negative effects can occur due to thermal and other environmental effects, as well as aging of the components.

Figure 9:
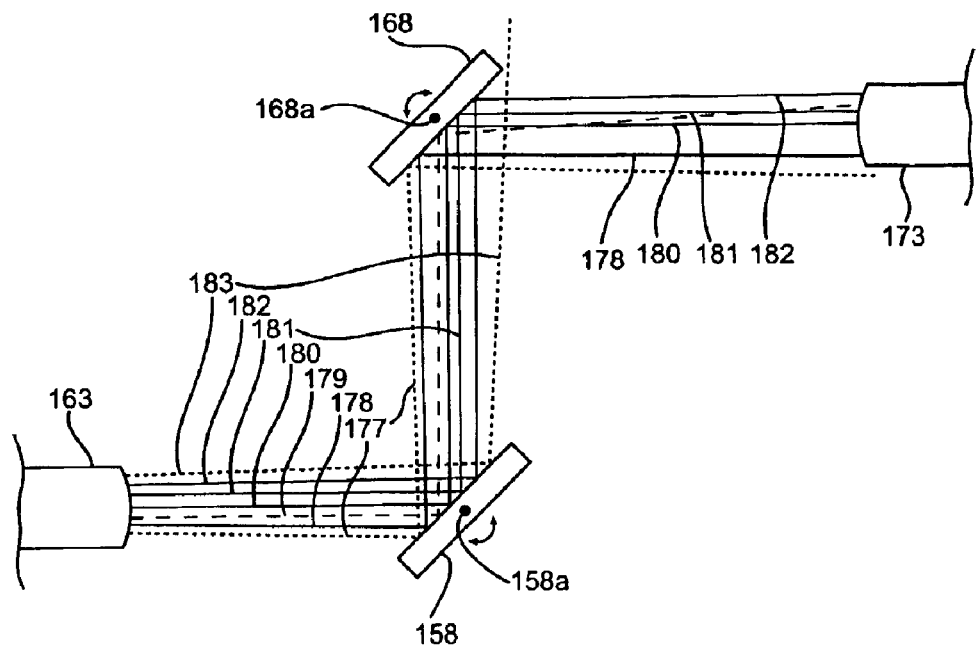
FIG. 9 is a close up view of a single light path of FIG. 8, including optical fiber coupling using a single mirror switching device.

The present invention can be applied to optical switching configurations to correct for, and thereby substantially eliminate sources of losses due to misalignment of mirrors, imperfections in mirror surfaces and other physical causes of light loss through a switching mechanism. FIG. 9 is a schematic, two-dimensional representation of a switching arrangement which shows only one micromirror device (158, 168 respectively) from each of the input and output arrays, for simplicity of discussion. An optical input signal is incident upon micromirror device 158 as delivered by input channel 163. Seven light rays 177–183 representing parts of a single light beam are schematically represented in FIG. 9 as being incident on the mirror surface of micromirror device 158, from which they are then reflected toward micromirror device 168 and are then directed to output channel 173, where 158a and 168a represent the axis of rotation of these mirrors. In this example, light rays 177 and 183 become misaligned with the mirror surface of micromirror device 168 due to expansion of the beam hitting the mirrors. Similarly, light ray 179 is misdirected and is not delivered to output channel, due to light scattering which may be caused by a lack of flatness in the mirror surface of micromirror device 158 or other malformation which cause misalignment of the light reflecting off of a portion of the mirror.

Note that although the micromirror devices 158 and 168 are adjustable by tilting about axes 158a, 168a, that any further adjustment of the micromirror devices 158, 168 in FIG. 9 would not result in a reduction of light loss. For example, if micromirror 158 were tilted by a slight rotation in the clockwise direction, then ray 183 might be directed onto the surface of micromirror 168, but at the same time, ray 178 might then miss the reflective surface of micromirror 168, and certainly ray 177 would still not be reflected off of micromirror 168. Similarly, while rotation of micromirror 168 in the counter clockwise direction might direct ray 177 into the optical output channel 173, it would also misdirect ray 178 at the same time, so as to no longer be channeled into the output channel 173.

Figure 10:
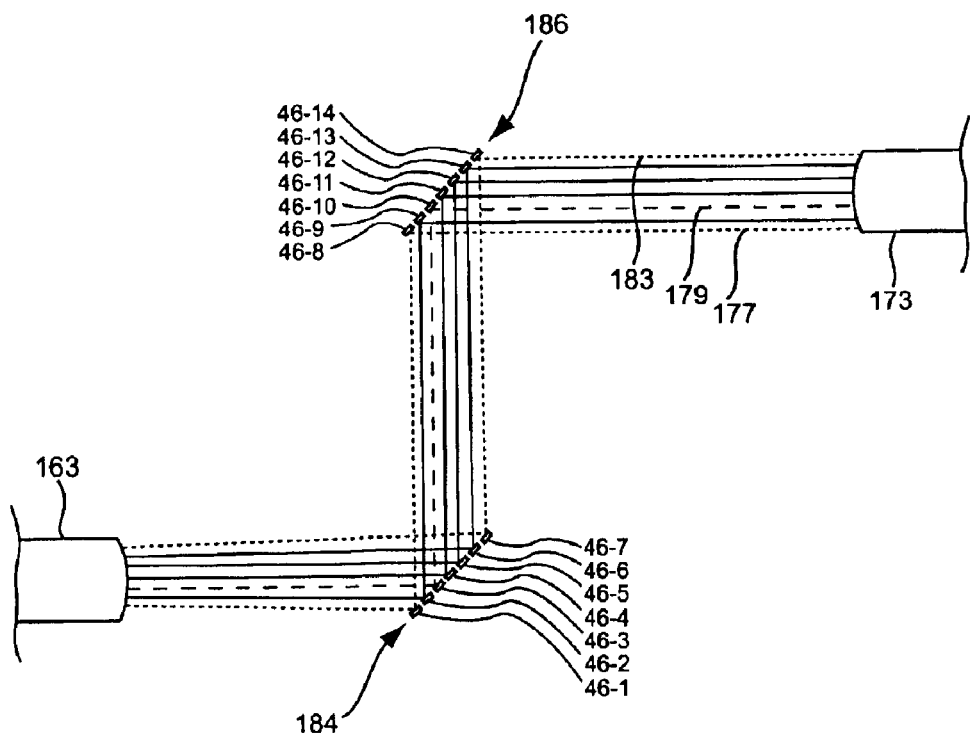
FIG. 10 is a close up view of a single light path of FIG. 8, including optical fiber coupling using a multiple mirror switching device.

By replacing each of the micromirror devices 158, 168 with a plurality of smaller and more controllable micromirror devices 46 as shown in FIG. 10 according to the present invention, a micromirror assembly (184, 186, respectively) is provided to replace each of the micromirror devices 158, 168 of FIG. 9. Each micromirror assembly is made up of a plurality (seven, in the non-limiting schematic example shown) of micromirror devices 46 (labeled here as 46-1 through 46-14), each of which is independently controllable for movement of a mirror surface about two axes of rotation independently, or about an unlimited number of axes of rotation defined by the resultant vectors occurring when rotating to varying degrees about both axes of rotation. In the example shown, the micromirror device 46-1 has been rotated or tilted in the clockwise direction so as to align ray 177 with the corresponding micromirror (46-8) on assembly 186, so that ray 177 is now properly channeled to the optical output channel 173. It is noted that the rotation of micromirror 46-1 is shown in an exaggerated fashion for purposes of explanation, and that the actual rotation of the mirror would be much less, so as to be essentially imperceptible, while having the effect of "flattening" the reflective surface in this location for reflecting the ray 177 in the correct direction. Similarly, micromirror 46-7 is tilted or rotated somewhat counterclockwise, so as to accurately direct light ray 183 to be incident upon micromirror device 46-14, which in turn directs the ray 183 into the optical output channel 173. The micromirror device 46-3 in assembly 184 has been tilted or rotated in the counterclockwise direction to redirect ray 179 into the proper position on assembly 186 to permit proper direction into the output channel.

In this particular example seen in FIGS. 9 and 10, the light beam from optical input channel 163 is shown slightly expanding to illustrate details of the present invention. In an actual system, the light beam would be carefully focused to keep the spatial profile of the beam as small as possible throughout the length of the optical switch. By keeping the beam size small, the size of the individual mirrors and the spacing between them can be made smaller as well, which allows for a high density switching matrix. This is desirable, since MEMS micromirror designs generally have a limited usable angular range of movement, so a greater density leads directly to a higher port count in the switch. Changing the beam size in this manner has several adverse consequences however. Even if all of the rays are focused so that they kit the focusing lens at the output channel, the outgoing angle of each ray (177–183) may not be best for good coupling efficiency into the fiber. Adjustment of both of the switching mirrors for best coupling does not eliminate much of the loss. To accommodate for relatively large spacing between the mirrors, often a long distance between mirrors is needed. Maintaining small beam spot sizes throughout a longer distance requires very good uniformity of focusing elements on the incoming beams. These constraints can make it difficult to create a working device with a high port count when using larger flat mirrors.

By providing a plurality of independently adjustable micromirrors 46 to form each micromirror assembly (such as 184 and 186), input and output arrays of these assemblies can then be constructed in making an optical switching or cross-connect apparatus which is capable of reducing the amount of light loss, as compared with those currently available. The ability to independently adjust devices 46, in effect, gives the assemblies the ability to optically adapt to the wavefront of the optical signal that is being received, and to manipulate that wavefront to maximize the amount of the signal that is ultimately received at the output end of the switching device. The reflective surfaces of the micromirrors 46 in assemblies 184 and 186, as has been previously mentioned, can thus be used as programmable Fresnel mirrors to focus the light received and reflected so as to minimize losses. It is much easier to keep light focused properly over a short distance as opposed to a long distance. Using a plurality of mirrors allows any focusing element after an input fiber to be optimized for only a short distance to the first mirror array. The first mirror array can focus properly to the second mirror array, and the second mirror array will then focus properly for good coupling into the output fiber.

Although a small amount of light is lost due to the spacing between the micromirror devices 46 in each array, this loss is small compared to the amount of light that would ordinarily lost by a system such as shown in FIG. 9, but which is recaptured by proper orientation of the micromirrors 46 as discussed with regard to FIG. 10. Although the example of FIG. 10 has been described with regard to a one dimensional assembly of micromirrors 46 to form the assemblies 184, 186 (i.e., a 1×7 array of the micromirrors 46 in each assembly), it is to be noted that the present invention is in no way limited to such arrangement, as such arrangement has been described only for purposes of simplicity. In fact, the more likely assembly is to include a two-dimensional array of micromirrors 46 to form each assembly, even with a switching setup as shown in FIG. 8. For example, a micromirror device 20 can be replaced by a 10×10 or 100×100 array of micromirrors 46 to form an assembly such as the array 124 shown in FIG. 6. Because the micromirrors 46 have the ability to tilt or rotate about two axes (or combinations thereof, as noted above) it is preferable to form a two-dimensional array of the micromirrors in each assembly, for three-dimensional redirecting, or focusing, of incident light signals.

Figure 11:
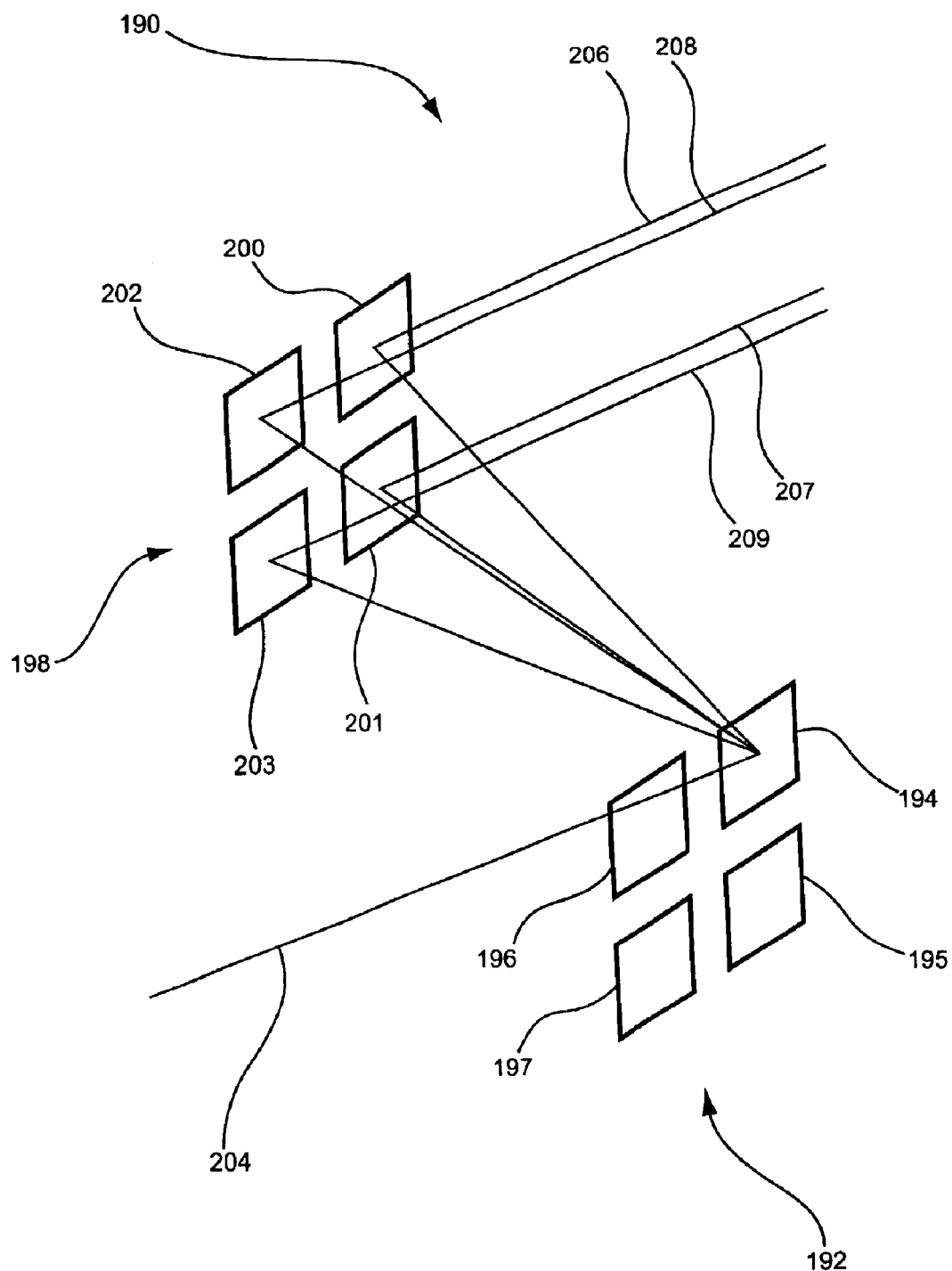
FIG. 11 is a perspective view of a three-dimensional 4 by 4 optical switch showing the mirror elements and light beams.

FIG. 11 is a schematic representation of a three-dimensional cross-connect arrangement 190. In this arrangement, the micromirror devices can be three-dimensionally positioned so as to optically connect any micromirror in the optical input array 192 with any micromirror in the optical output array 198. Thus, for example, by appropriate position of micromirror 194 and a corresponding micromirror in the optical output array 198, the optical input 204 can be directed to be outputted to any of optical outputs 206–209 by appropriate optical connection of micromirror 194 with respective ones of optical output micromirrors 200–203. Each of input side micromirrors 195–197 has similar possibilities, with the appropriate corresponding adjustment of the output micromirrors.

Figure 12:
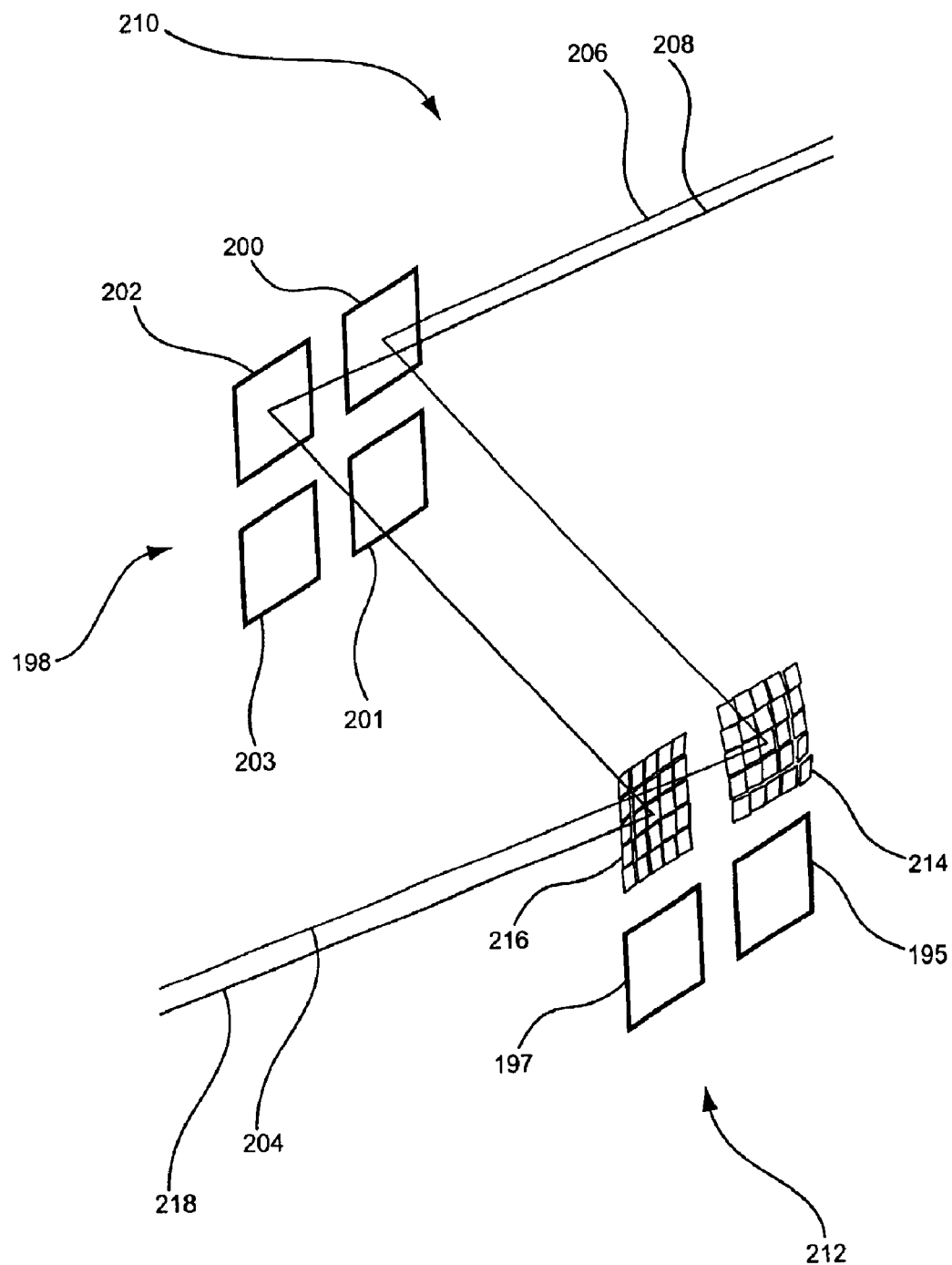
FIG. 12 is a perspective view of the same switch as shown in FIG. 11, but with two mirrors replaced by multi-mirror arrays.

FIG. 12 is a three-dimensional cross-connect 210 similar to the cross-connect 190 in FIG. 11, but with two of the mirror elements 194 and 196 being replaced by exemplary 5×5 arrays 214 and 216. Replacing the single mirror elements has a number of advantages already addressed, but which may be more apparent as seen in this figure. In this example, the two arrays are set to act as two different focusing elements for the beams being switched. If input beam 204 has slightly changed focusing characteristics than input beam 218, the array elements can be adjusted independently to maximize the coupling efficiency. Most often, the input beams of an optical switch are focused coming out of an optical fiber by either a lens array or an individual lens on each fiber. Uniformity of focal lengths for these lenses can be very difficult to achieve, yet small changes in the consistency of these lenses can have a large effect on the focusing of the beam, and thus on the efficiency of coupling light back into the output fiber. Using a small array of mirrors to act as an additional lens element as a part of the optical path allows for slight changes in the input beam without sacrificing power throughput into the output. In an actual system based on these designs, all of the rest of the input and output mirrors 195, 197, 200–203 would be represented by a similar array of micromirrors.

Another advantage of the multimirror array is that of positioning. In a single mirror system as shown in FIG. 11, each input fiber must be precisely aligned to the center of its corresponding mirror along with all the other input fibers. Small irregularities may make the input beam clip on the edge of the mirror or miss it altogether. Individual adjustments of each fiber and/or focusing components is commonly not possible, so much of the time, the entire array of input fibers and lenses are aimed to find the best compromise position, even though throughput on many of the channels suffers as a result. Achieving exact uniformity is no simple task. One possible solution for this problem is to make the size of each individual mirror in the arrays 192 and 198 larger. While this reduces the problem of losing power from the beam at the edges of each mirror, it does have the drawback of lowering the density of the mirror array as a whole, which as has already been discussed, will lower the total port count of the switch. In FIG. 12, a single mirror is replaced by an array of mirrors. In actuality, each single mirror would be replaced by an array of mirrors with no particular boundaries between the original surfaces of the single micromirrors, but which was displayed in this fashion for clarity. In FIG. 12, between array 214 and 216 would appear a number of identical mirrors; in aggregate, all of the mirrors would make a single large array. If the center of a single fiber was tilted incorrectly by a small amount to change the position of its input beam on the mirror array, this new location could be chosen as the center of its steering set of mirrors with no extra loss to the beam falling off an edge. Of course, uniformity of the input fibers and beams cannot be so poor as to overlap parts of more than one beam at any one place on the array as a whole, but small changes that would adversely affect performance on single-mirror systems will not harm throughput here. In addition, the lack of boundaries for the array domain of a single light beam allows a tighter spacing of the beams, which as has been mentioned previously, would allow for a higher density switch with greater port count.

FIG. 6A showed an assembly of micromirror devices 46 that comprise the present invention which form a micromirror assembly 124 effective to replace micromirror device 194 (or any of the other micromirror devices 195–197 and 200–203) in FIG. 11, although this size of array is not limiting. A typical micromirror device currently used in the optical switching field employs a mirror surface having width and length dimensions of about 1 mm×1 mm. Using present techniques, micromirror devices 46 or 47 according to the present invention may be made to have a mirror surface as small as about 8 microns by 8 microns. Thus, an assembly of 15,000 micromirrors (i.e., a 125×125 array) could be provided to replace a single micromirror device in the prior art. As noted previously, the present invention is not limited to this size of micromirror, as micromirrors having dimensions larger than 8 microns by 8 microns can certainly be made, such that an assembly having a plurality, but a lesser number than one hundred micromirror devices 46 could be assembled to replace a single known micromirror device. Also, it is contemplated that even smaller micromirror devices 46 will be possible as the state of the manufacturing arts progresses.

Another important application of the mirror devices in the present invention is one commonly used in adaptive optics, which is that of phase-correction. This has been increasingly utilized in various fields such as astronomy or confocal microscopy to improve the quality of their imaging techniques, in some cases drastically. The primary component of a phase-correcting adaptive optics system is a deformable mirror surface, which was discussed in general in the Background section but will be shown here in more detail. The deformable surface is generally changed in real time to correct for phase distortions between various portions of the image.

Figure 13A:
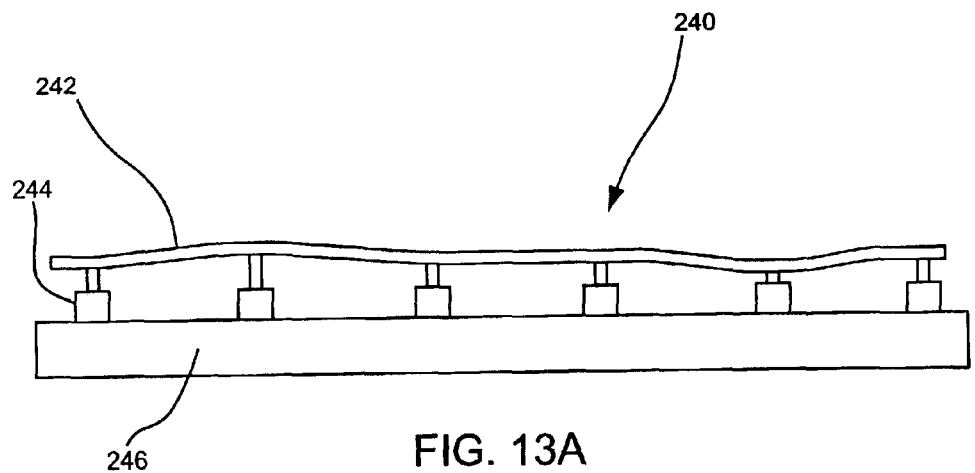
FIGS. 13A and 13B show prior art for a MEMS-based phase-corrective adaptive optics technique.

FIG. 13A shows a portion of a common type of adaptive optics mirror used in the prior art in a simplified form. The mirror assembly 240 is composed of a single flexible mirror surface 242 over a substrate 246. The mirror surface 242 is held over the substrate 246 by a sparse array of linear actuator elements 244, six of which are shown here. Actuator elements 244 might work using a variety of methods, such as electrostatic attraction, piezoelectric effects, thermomechanical, or others. Spacing of actuators 244 is normally chosen to maximize control of the mirror surface but minimize complexity. Because the mirror surface connects all of the actuators into one large system, moving the mirror to a desired shape can involve complicated interactions between various elements 244. Often detailed models are needed in order to adjust the mirror surface 242 to a desired shape. One advantage to this type of system is that the reflective surface is single and unbroken.

Figure 13B:
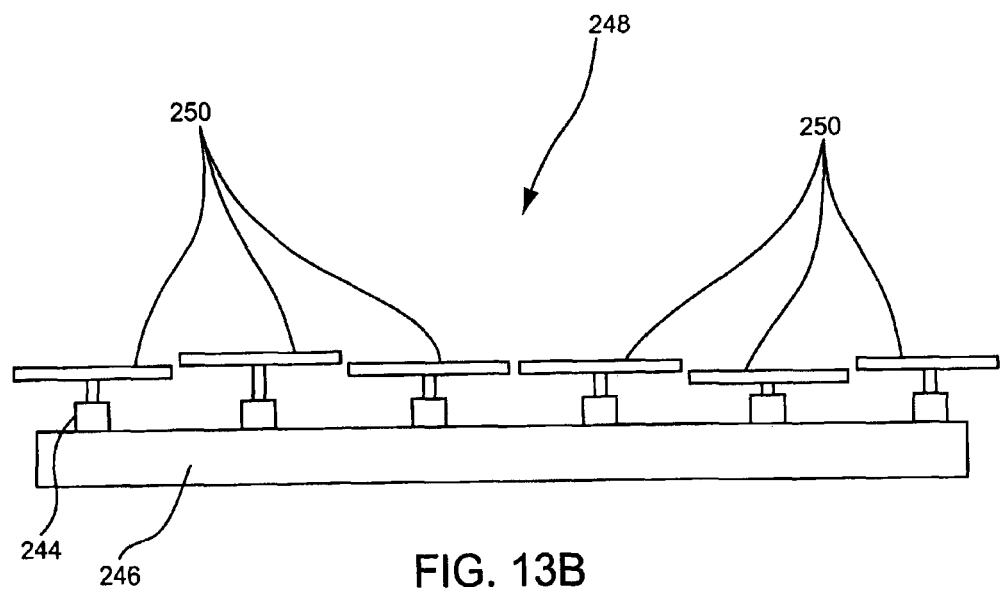

FIG. 13B displays a similar device 248, but in this case, individual mirrors 250 replace the large mirror surface 242. As can be seen here, the heights of the mirrors can be adjusted to mimic most any shape capable of by device 240. In comparison, this mirror surface has a number of small gaps in it, which may scatter incoming light, especially if the gaps are too large. This is compensated for by the flexibility of the device and the straightforward control, as each mirror's position does not affect the one next to it. For ease of comparison, the two devices shown in FIGS. 13A and 13B are the same scale, although this is not typically the case. In most cases, the multimirror device 248 requires many more micromirrors and a higher density of actuators to achieve the same shape; power consumption of this device can be higher.

Figure 13C:
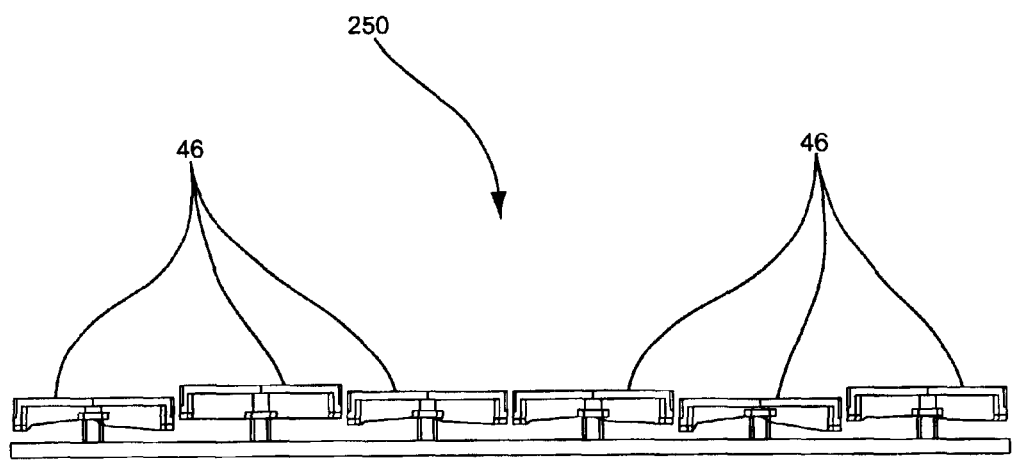
FIGS. 13C and 13D show such activity as enabled by the present invention.
Figure 13D:
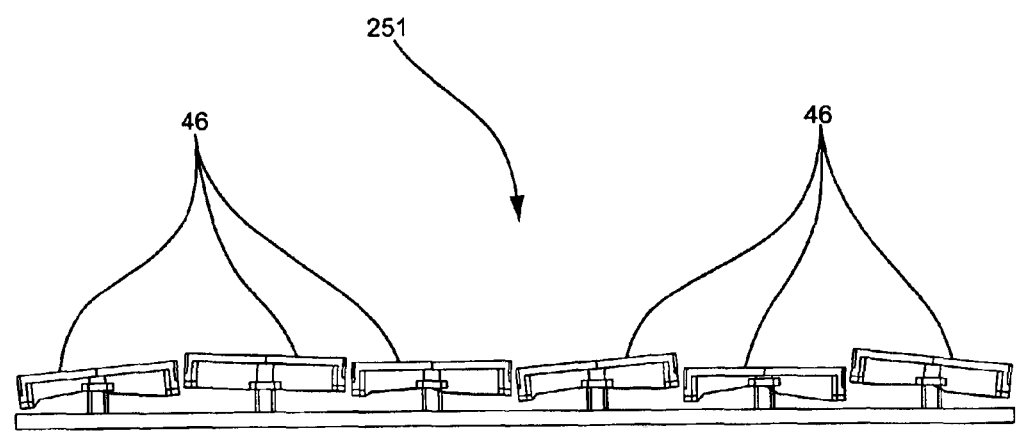

A device that can be built with the present invention bears some resemblance to array 248 in FIG. 13B. FIG. 13C shows an array of individual elements 46 that can be actuated in an up/down fashion. If all of the electrodes of a particular mirror element such as 46 are driven at the same voltage, equal force will be applied to the entire mirror in the vertical direction perpendicular to the plane of the mirror. Because the design of the hinges gives great flexibility, the assembly 46 should have dynamic range down to the stopping point of the mirror. However, as shown in FIG. 13D, with mirror elements according to the present invention, additional features may be offered. Namely, one of the advantages of the inventor's designs is the ability to actuate mirrors in multiple axes at once. Unequal driving voltages on the various electrodes will both tilt the mirror and drive it vertically simultaneously.

Thus, both tilt-correction and/or phase-correction of incident light can be implemented on the same surface. This not only can greatly simplify the control electronics needed to drive the system as a whole, but also may have other optical benefits as well. In some types of systems, spatial distortions can be created in a light beam when the tip/tilt and phase-corrective surfaces are separated in space. By having both corrections performed by the same surface, some artifacts such as parallax errors can be eliminated Note also that scale of the micromirrors can play an important role here. In the micromirrors 46 as described earlier, the preferred size of each mirror is relatively small, down to the order of 8–10 microns in diameter. Smaller sizes allow for lower power consumption and greater angle for a given mirror height. This may not be best for phase-correction applications; many of these applications need movement of the mirror surface to be several wavelengths of the light in question. In most cases, this is no more than several microns. The smallest scale of the mirrors does not allow for this range of movement. Creating the micromirrors somewhat larger or with different thicknesses of components will allow for a greater range, but may limit the angle permitted for tilting. It is likely that for a mirror surface that allows both tilt and vertical movement, the scale chosen will have to be a compromise between these two extremes to give a device useable for both types of movement, at least for some applications. For other applications, little transverse movement of the mirror is necessary, and even the smallest mirrors will work well.

Figure 14A:
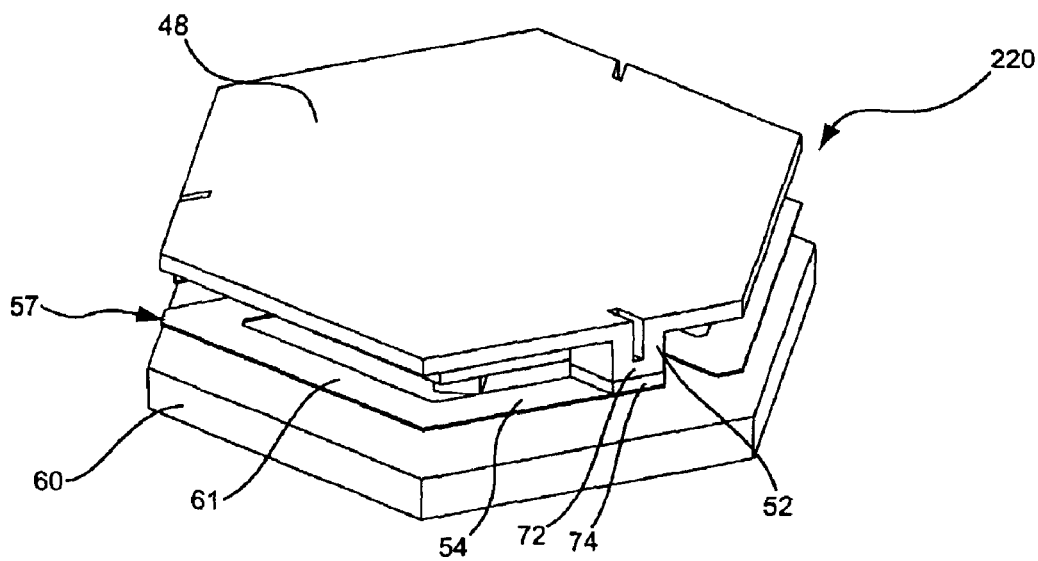
FIGS. 14A–14C show the same views of a variant element of FIG. 3 using a different flexure design with via electrodes.
Figure 14B:
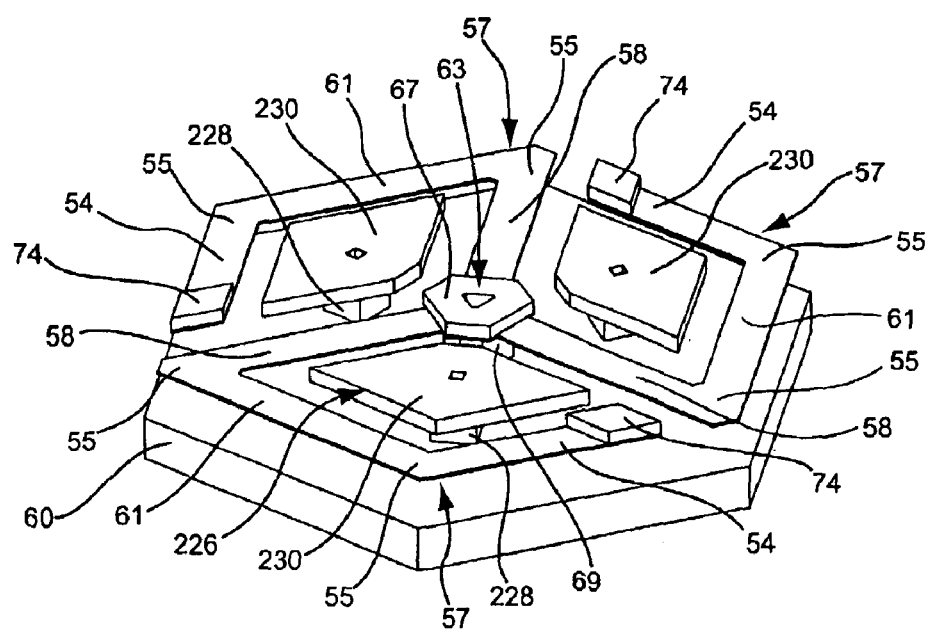
Figure 14C:
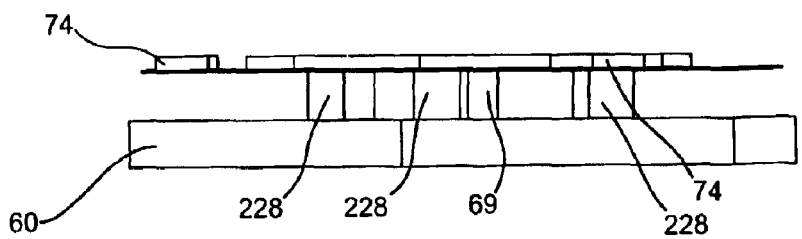

A number of other variants to the design of the present invention are possible other than the one shown in FIG. 3. FIGS. 14A–C provide details of a micromirror 220 with a hexagonal-shaped mirror top supported at several side positions. Its construction and appearance closely resemble the micromirror elements 46 shown in FIGS. 3A–C, and views for each part of the figure are the same. In this variant of the device, the hexagonally shaped mirror 48 is attached to the hinge structure 54 at its side supports 52, another hinge portion 58 is attached to the substrate 60 with a similar hinge joint 63.

As for hinge structure, a difference to be observed is that each hinge structure 57 includes an additional bar/section 61 between the other two portions of the hinge (54 and 58). Longer hinge sections as thus provided offer more compliance than that of hinge 57 in FIG. 3, and may allow for easier actuation of the mirror. A potential drawback in this design, however, is that the additional area taken up by the larger hinge impinges on area previously taken up by electrode 76. Yet, the greater movement allowed by the longer hinge structure should make up for this deficiency. As noted above, the selection of certain features of the invention for their relative benefits may depend on the application sought.

Another difference in this design as compared to that in FIGS. 3A–3B is shown in the electrode design. In FIGS. 14A–114C, instead of a staggered multi-level electrode 76, a single stepped electrode 226 is shown. Using a via-based support column 228, the entire electrode surface 230 is raised close to the mirror. This configuration allows for the maximum electrostatic attraction.

Although a via electrode may be preferred in that less voltage should be needed to achieve the same degree of electrostatic attraction, for manufacturability, a staggered electrode may be preferred. A via-type electrode may potentially block the mirror from reaching its maximum angle of tilt in certain directions for some electrode/hinge layouts. One other electrode variant, not pictured here, is that of using a flat single electrode low on the substrate 60. Although this design would have the least electrostatic attraction, and thus be more difficult to actuate, it would be very simple to manufacture. Of course, any of the electrode designs described with regard to the example in FIG. 14B is not limited to the micromirror shown in FIG. 14, but may be applied to any of the other designs described herein and vice versa.

Note that regardless of the choice of electrode configuration in any of the invention's variants, the hinges, mirror, and electrode have been designed not to interfere with each other. Because the hinge and electrode layers are constructed at the same time, there is no overlap between them except at the junctions. At the mirror's maximum angular extension in both axes, the mirror touches down only on the substrate 60 or on the hinge supports 62. While in normal operation, the mirror and attached metal structure are charged up to a bias voltage, and the addressing electrodes are charged to a different voltage, there is no danger that the structures will short out and potentially damage or disable one or many other mirrors.

Figure 4A:
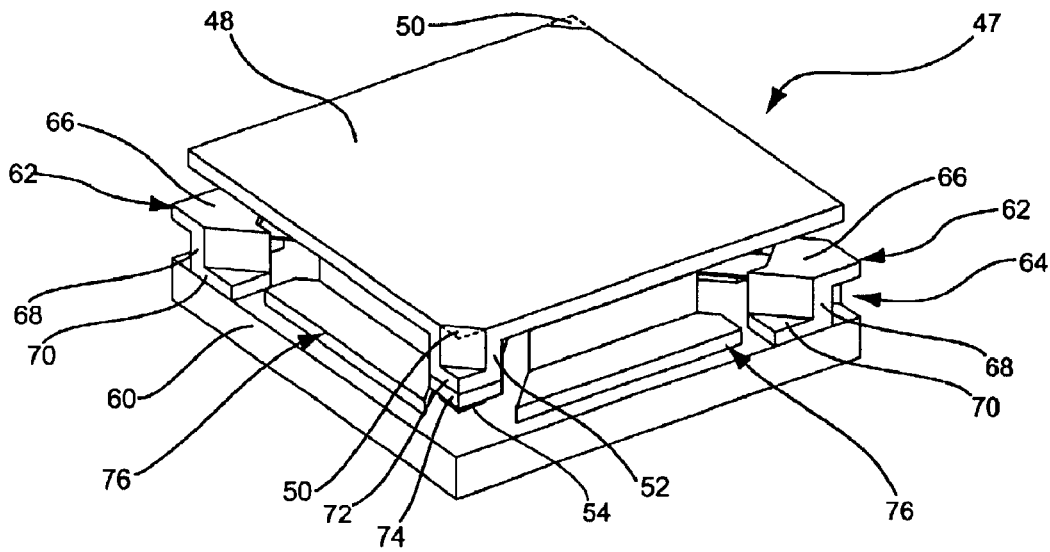
FIG. 4A shows a perspective view of a different configuration of the present invention.
Figure 4B:
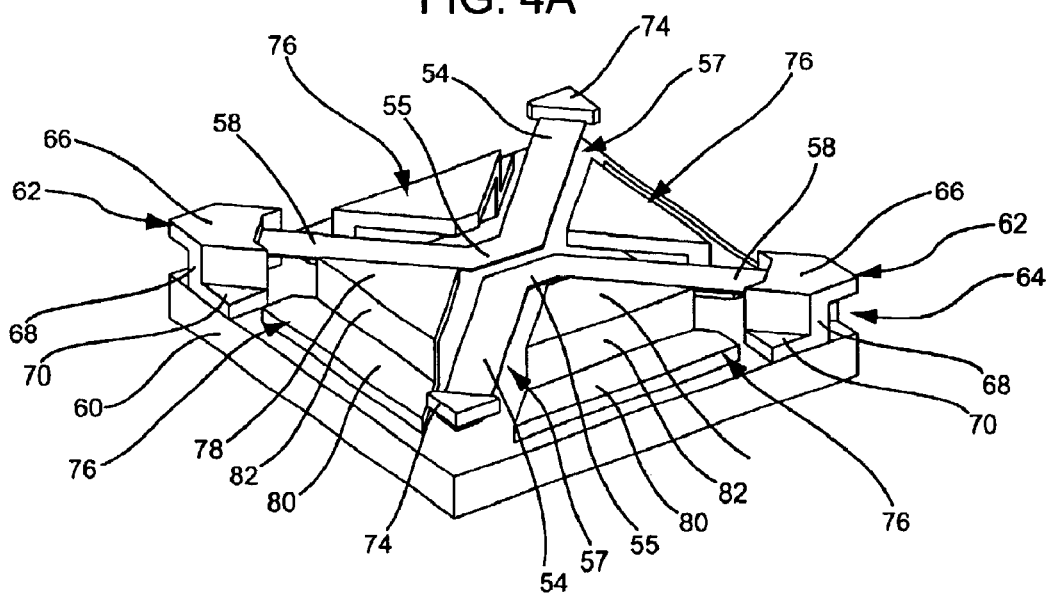
FIGS. 4B and 4C are similar to those in FIG. 3.
Figure 4C:
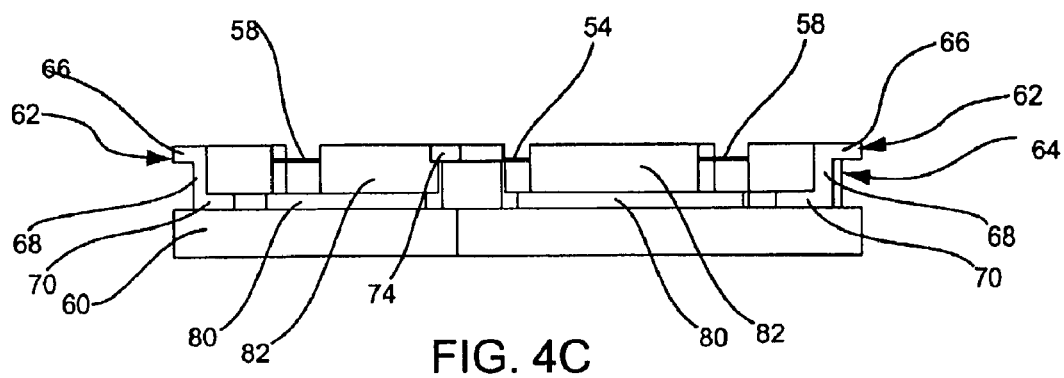

A number of other configurations of hinges and electrodes are possible using the same conceptual framework than have been taught here. A schematic view of some of the connectivity possible is shown in FIGS. 15. The schematic mirror layout 252 in the upper left hand corner of FIG. 1 SA corresponds to the design presented in FIGS. 3A–3C; that of FIG. 15 N corresponds to the design of FIGS. 4A–4C is in; FIG. 15C corresponds to FIGS. 14A–14C.

In each mirror layout, a dark circle 256 corresponds to a generalized connection to the substrate, dark lines 254 correspond to hinge material, and open circles 258 correspond to connections of hinge material to the mirror. The listing of possible configurations in each of FIG. 15 is by no means intended to be exhaustive, and is only a sample of the possibilities covered herein. In addition, although for simplicity only hexagonal and square shapes are shown, many other shapes are possible that neatly tile a plane. The designs shown, however may be most preferred for the superior capabilities they offer as determined by the present inventor.

Figure 15A:
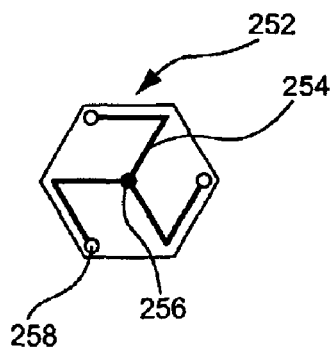
FIGS. 15A–15R shows a number of advantageous variants in hinge and electrode design in simplified form, wherein substantially straight hinge sections are employed.
Figure 15B:
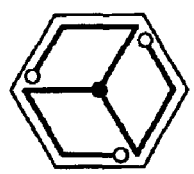
Figure 15C:
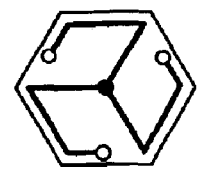
Figure 15D:
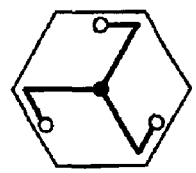
Figure 15E:
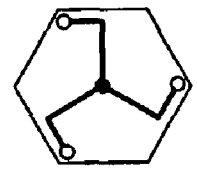
Figure 15F:
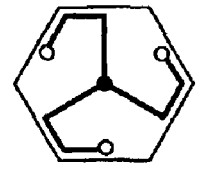
Figure 15G:
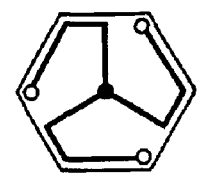
Figure 15H:
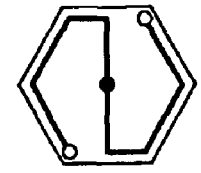
Figure 15I:
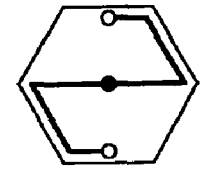
Figure 15A:
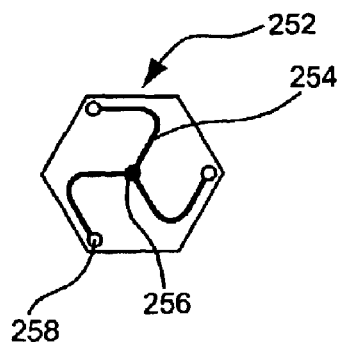
Figure 15B:
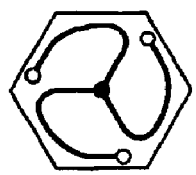
Figure 15C:
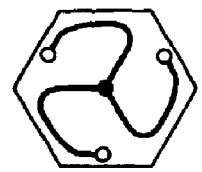
Figure 15D:
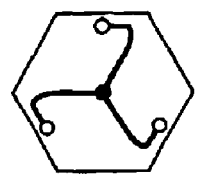
Figure 15E:
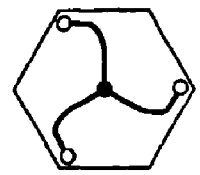
Figure 15F:
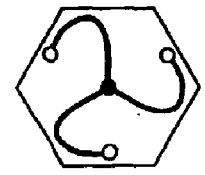
Figure 15G:
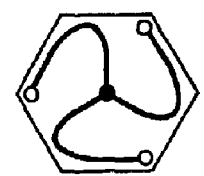
Figure 15H:
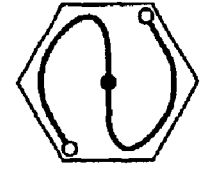
Figure 15I:
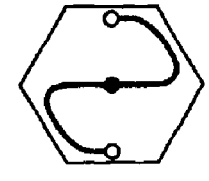
Figure 15J:
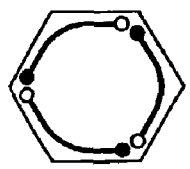
Figure 15K:
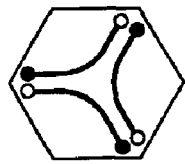
Figure 15L:
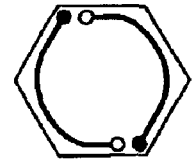
Figure 15M:
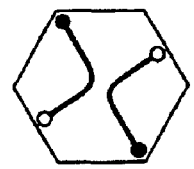
Figure 15N:
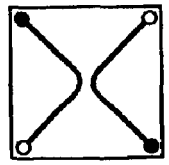
Figure 15O:
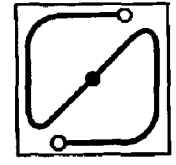
Figure 15P:
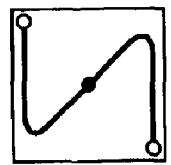
Figure 15Q:
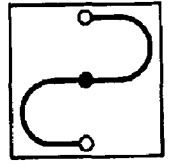
Figure 15R:
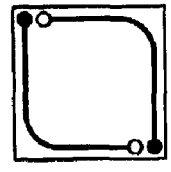

Still further, it is noted that the variations of the invention schematically pictured in FIGS. 15A–15R are represented by counterparts in FIGS. 15A'–15R'. These "counterparts" that employ substantially curved hinge sections. In both sets of figures, the hinges share the common characteristic of having components or portions that are directed along different paths (i.e., that extend in different directions). For stress relief purposes, it may in fact be the case that hinges/deformable members with a more or less curvilinear profile are employed in the invention.

Figure 16A:
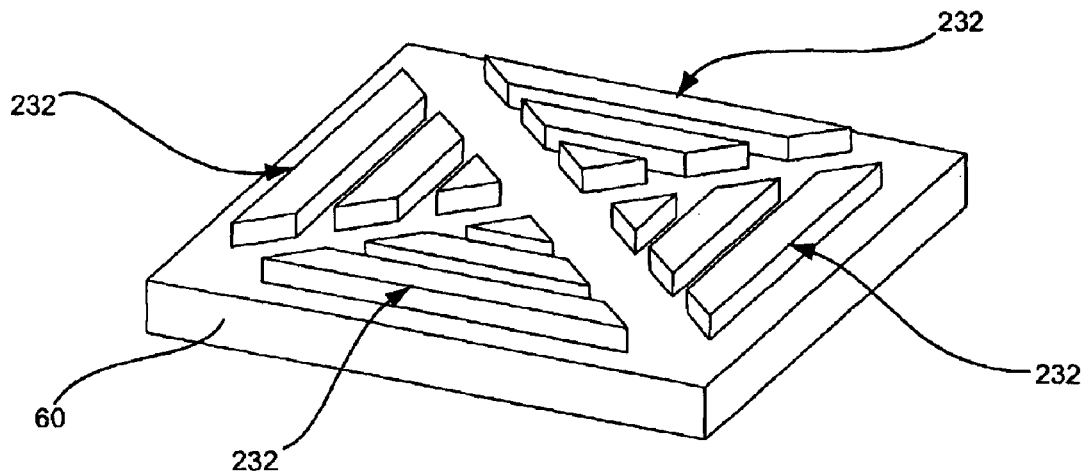
FIGS. 16A–16C show several types of segmented electrode designs with varying heights.
Figure 16B:
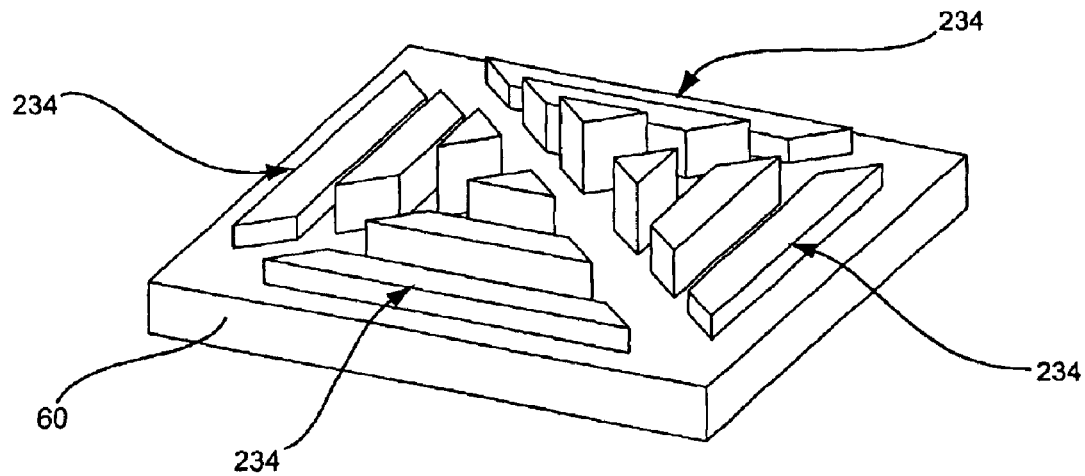
Figure 16C:
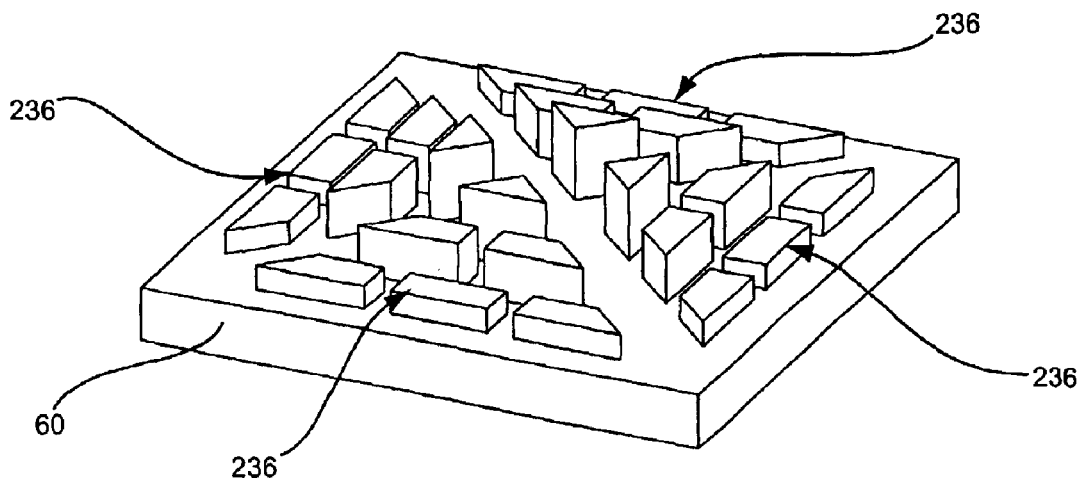

Still further variation possible in connection with the present invention has to do with multiple electrodes replacing any of the electrodes discussed previously, whether staggered, via, or flat. Some of these possible designs are shown in FIGS. 16A–C. FIG. 16A shows substantially the same element as is seen in FIG. 4B, but with the hinge substructure removed so that only the substrate 60 and the electrodes 232 are left. In this case, each of the electrodes 76 (e.g., from the embodiment of FIG. 4B) has been replaced by an electrode array 232. Although various types of electrodes have been proposed with different shapes and height configurations, the electrode array 232 is different than previously mentioned ones because each element of the array 232 can be addressed independently.

FIG. 16B shows a different type of electrode array 234 used in place of single electrodes 76. Here, not only the shape of each subelectrode is varied, but also the height, to vary the field strength of each element in the array 234. FIG. 6C displays yet another potential variation, where electrode arrays 236 are broken up further in two dimensions. Single element electrodes 76 require fine control of voltage to enable analog movement of the mirror for continuous positioning. Using a multi-element electrode, control circuitry for each mirror element 46 may be considerably less complex. Potentially, with sufficient numbers of addressable electrodes underneath a mirror, near analog control of a mirror may be possible using digital addressing.

Other configurations of electrodes and overall mirror and related hinge connection configurations are within the scope of the present invention. In the embodiments of the invention shown and such others as may be envisioned, it can be appreciated that variation may also be presented, for example, with respect to the vertical spacing of elements. Notably, the height or relative spacing of selected items may impact the size and/or orientation of components such as the electrode regions. That is, electrode shape and height may require customization to avoid interference in meeting desired deflection ranges of the micromirror.

In addition, it is noted that features described herein in connection with MEMS processing may be applied on a relatively large scale. That is to say, as used herein the term "micromirror" may be applicable to mirror structures upwards of 1 mm in diameter, height and/or length. Such larger structures may find applications outside the fields mentioned here. In all, it is to be appreciated that devices made according to the present invention may be employed not only in the context discussed referring to optical switching arrangements, but further applications involving adaptive optics may apply.

Whatever the case may be, the breadth of the present invention is to be limited only by the literal or equitable scope of the following claims. Efforts have been made to express known equivalent structures and/or features as may be applicable. That any such item or items may not be expressed herein is not intended to exclude coverage of the same in any way.

Accordingly, I claim:

1. A micromirror device comprising:
   a substrate with electrical components including address circuitry;
   a micromirror having a reflective surface; and
   a support structure underlying said micromirror so as to be concealed from view when viewed from a direction normal to said reflective surface and interconnecting said substrate and said micromirror, said support structure including at plurality of deflection members, each deflection member mounted to said substrate and said micromirror, and configured to permit rotation of said micromirror about multiple axes of rotation end drawing said micromirror toward said substrate in a manner sufficient to provide a device capable of both tilt and phase correction.

2. The device of claim 1, wherein two deflection members are provided and mounted to two opposite ends of said micromirror.

3. The device of claim 2, wherein said two opposite ends of said micromirror are opposite corners.

4. The device of claim 2, wherein said two opposite ends of said micromirror are opposite sides.

5. The device of claim 1, wherein three deflection members are provided and mounted to ends of said micromirror inopposite of one another.

6. The device of claim 5, wherein said ends of said micromirror are corners.

7. The device of claim 5, wherein said ends of said micromirror are sides.

8. The device of claim 7, wherein said three deflection members are mounted adjacent to corners of said micromirror.

9. The device of claim 1, wherein said deflection members are mounted to said micromirror at substantially equally spaced intervals.

10. The device of claim 1, wherein said deflection members are mounted to said mirror in a pattern with bilateral symmetry.

11. The device of claim 1, wherein said deflection members are mounted to said mirror in a pattern with three-way symmetry.

12. The device of claim 1, wherein said micromirror is substantially quadrilateral.

13. The device of claim 12, wherein said micromirror is substantially square.

14. The device of claim 1, wherein said micromirror is substantially hexagonal.

15. The device of claim 1, wherein said deflection members are mounted to said substrate at a common location.

16. The device of claim 1, wherein said deflection members are mounted to said substrate at discrete locations.

17. The device of claim 1, wherein said deflection members comprise at least one portion having a component in one direction and another portion having a component in another direction.

18. The device of claim 17, wherein said components are provided in a plane.

19. The device of claim 17, wherein said portions are provided by straight sections.

20. The device of claim 19, wherein said portions are provided by curved sections.

21. The device of claim 17, wherein said components are provided in two different directions.

22. The device of claim 17, wherein said components are provided in three different directions.

23. The device of claim 1, wherein said micromirror has a diameter of less than or equal to about 1 mm.

24. The device of claim 23, wherein said micromirror has a diameter of less than about 10 microns.

25. The device of claim 1, wherein said electrical components further comprise electrodes adapted to apply attractive forces to said micromirror.

26. A micromirror array comprising, a plurality of devices as described in claim 1.

27. The array of claim 26, wherein a common mounting portion to said substrate is provided for adjacent deformable members.

28. An optical switching mechanism, comprising:
a first array of optical reflectors adapted to receive and reflect optical signals from at least one optical input source; and
a second array of optical reflectors adapted to receive optical signals reflected from said first array of optical reflectors and reflect the optical signals toward at least one optical output;
wherein at least one of said optical reflectors comprising an assembly of micromirror devices according to claim 1.

29. The optical switching mechanism of claim 28, wherein each said micromirror device of said at least one assembly of micromirror devices is adapted for independent three dimensional orientation.

30. The optical switching mechanism of claim 28, wherein each said optical reflector comprises an assembly of micromirror devices.

31. The optical switching mechanism of claim 30, wherein each said micromirror device is adapted for independent three dimensional orientation.

32. The optical switching mechanism of claim 28, wherein each said assembly of micromirror devices forms a smart surface.

33. A method of optical switching, comprising:
providing an optical switching mechanism as described in claim 28;
directing light through said optical switching mechanism; and
switching light between a plurality of channels.

34. A micromirror device comprising:
a substrate with electrical components including address circuitry;
a micromirror; and
a support structure underlying said micromirror and interconnecting said substrate and said micromirror, said support structure including at plurality of deflection members, each deflection member mounted to said substrate and said micromirror, and configured to permit rotation of said micromirror about multiple axes of rotation and drawing said micromirror toward said substrate,
wherein said electrical components further comprise electrodes adapted to apply attractive forces to said micromirror, and
wherein at least one of said electrodes is configured with a plurality of portions at different levels, so that portions further from a center of rotation of said micromirror are at a greater distance from the micromirror than portions closer to the center of rotation.

35. The device of claim 34, wherein each of said electrodes comprises a stepped configuration.

36. The device of claim 34, wherein said electrode portions of each said electrode are continuous with one another.

37. The device of claim 34, wherein said portions are discrete members.

38. The device of claim 34, wherein each said electrode comprises a continuous angled member.

39. The device of claim 34, wherein said portions of each said electrode form an electrode array, and wherein at least one of said portions of at least one of said electrodes is addressable independently of the other of said portions.

40. The device of claim 39, wherein each said portion is independently addressable.

* * * * *